United States Patent
Sundararajan et al.

(10) Patent No.: US 10,082,915 B2
(45) Date of Patent: Sep. 25, 2018

(54) FLEXIBLE TOUCHPAD SENSOR DEVICE AND TOUCHPAD SYSTEM USING THE SAME

(71) Applicant: Intel Corporation, Santa Clara, CA (US)

(72) Inventors: Narayan Sundararajan, Palo Alto, CA (US); Steven T. Holmes, Redwood City, CA (US); Lakshman Krishnamurthy, Portland, OR (US); Prabhakar R. Datta, Portland, OR (US); Fuad Al-Amin, Sunnyvale, CA (US); Saurin Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 14/998,360

(22) Filed: Dec. 24, 2015

(65) Prior Publication Data
US 2017/0185183 A1   Jun. 29, 2017

(51) Int. Cl.
*G06F 3/044*  (2006.01)
*G06F 3/041*  (2006.01)
*G06F 3/0488* (2013.01)

(52) U.S. Cl.
CPC ............ *G06F 3/044* (2013.01); *G06F 3/0416* (2013.01); *G06F 3/04883* (2013.01); *G06F 2203/04102* (2013.01); *G06F 2203/04103* (2013.01)

(58) Field of Classification Search
CPC . G06F 2203/04102; G06F 2203/04103; G06F 3/0416; G06F 3/044; G06F 3/04883
See application file for complete search history.

(56) References Cited

U.S. PATENT DOCUMENTS

| | | | | |
|---|---|---|---|---|
| 6,307,751 | B1 * | 10/2001 | Bodony | G06F 1/16 361/679.08 |
| 9,553,963 | B2 * | 1/2017 | Piccionielli | H04M 1/0268 |
| 2008/0312579 | A1 * | 12/2008 | Chang | A61N 1/0412 604/20 |
| 2013/0109997 | A1 * | 5/2013 | Linke | G06F 19/3418 600/549 |

(Continued)

FOREIGN PATENT DOCUMENTS

WO    WO 2015103563 A1 * 7/2015 ............. G06F 1/163

*Primary Examiner* — Viet Pham
(74) *Attorney, Agent, or Firm* — Grossman, Tucker, Perreault & Pfleger, PLLC

(57) ABSTRACT

A touchpad system is disclosed herein that includes a touchpad sensor formed from a plurality of flexible materials and is at least partially integrated into host clothing or furniture such that the touchpad sensor is generally obscured from view. The touchpad sensor may be implemented as a resistive or capacitive touchpad, whereby user input is detected and converted into a proportional electrical signal. The touchpad sensor may include N layers of flexible materials configured to conduct electrical energy, and also conform to contours of a host object. At least one layer of the flexible materials may be heat sealed or otherwise adhered to an inner surface of the host object, such as beneath a shirt sleeve. Thus smart clothing/furniture may appear to be "normal" while also providing convenient user-access to a touchpad sensor that can robustly handle a wide variety of user-input to control operation of a remote computing device.

25 Claims, 15 Drawing Sheets

(56) References Cited

U.S. PATENT DOCUMENTS

2013/0190903 A1* 7/2013 Balakrishnan ....... A61B 5/7246
　　　　　　　　　　　　　　　　　　　　　　700/91
2014/0070957 A1* 3/2014 Longinotti-Buitoni ......................
　　　　　　　　　　　　　　　　　　　　A61B 5/6804
　　　　　　　　　　　　　　　　　　　　340/870.01
2014/0318699 A1* 10/2014 Longinotti-Buitoni ......................
　　　　　　　　　　　　　　　　　　　　A61B 5/0002
　　　　　　　　　　　　　　　　　　　　156/247
2016/0327979 A1* 11/2016 Lettow ................... G06F 1/163
2017/0038795 A1* 2/2017 Lettow ................... G06F 1/163

* cited by examiner

FLEXIBLE TOUCHPAD SENSOR DEVICE AND TOUCHPAD SYSTEM USING THE SAME

FIELD

The present disclosure is generally directed to human interface devices (HIDs), and more particularly, to capacitive and resistive touchpad sensor devices integrated into objects such as clothing and furniture.

BACKGROUND

Wearable computing technology, or so-called "smart" clothing, fuses personal expression with high-tech functionality. Likewise, "smart" furniture seeks to provide functional furniture (e.g., a couch, a chair, a bench) while also integrating electronics that allow manipulation of a local or remote computing system. In the context of wearable computing technology, it may be aesthetically pleasing or otherwise fashionable to prominently display smart devices on, for example, a sleeve, a wrist, a belt, a thigh, or other visible location on their person. Some such example devices include smart watches, personal music players (e.g., MP3) and eye-glass computers.

In other cases, users may hide or otherwise place wearable technology in locations on their person less visible based on a user's particular personal preferences. For example, users may tuck earbuds and associated wiring into special earbud pockets provided by a jacket, or can place a smart watch beneath a sleeve. While such clothing features allow wearable technology to be hidden, or at least partially hidden, this may unfortunately place wearable computing devices out-of-reach. For instance, a portable music player (e.g., MP3) placed within a user's pocket may obstruct or otherwise complicate the user's ability to, for example, access user input features to make volume adjustments and manipulate playback (e.g., play, pause, forward, and so on). Accordingly, providing aesthetically pleasing smart clothing and furniture that also allows substantially unobstructed user-input raises numerous non-trivial challenges.

Figure 1A:
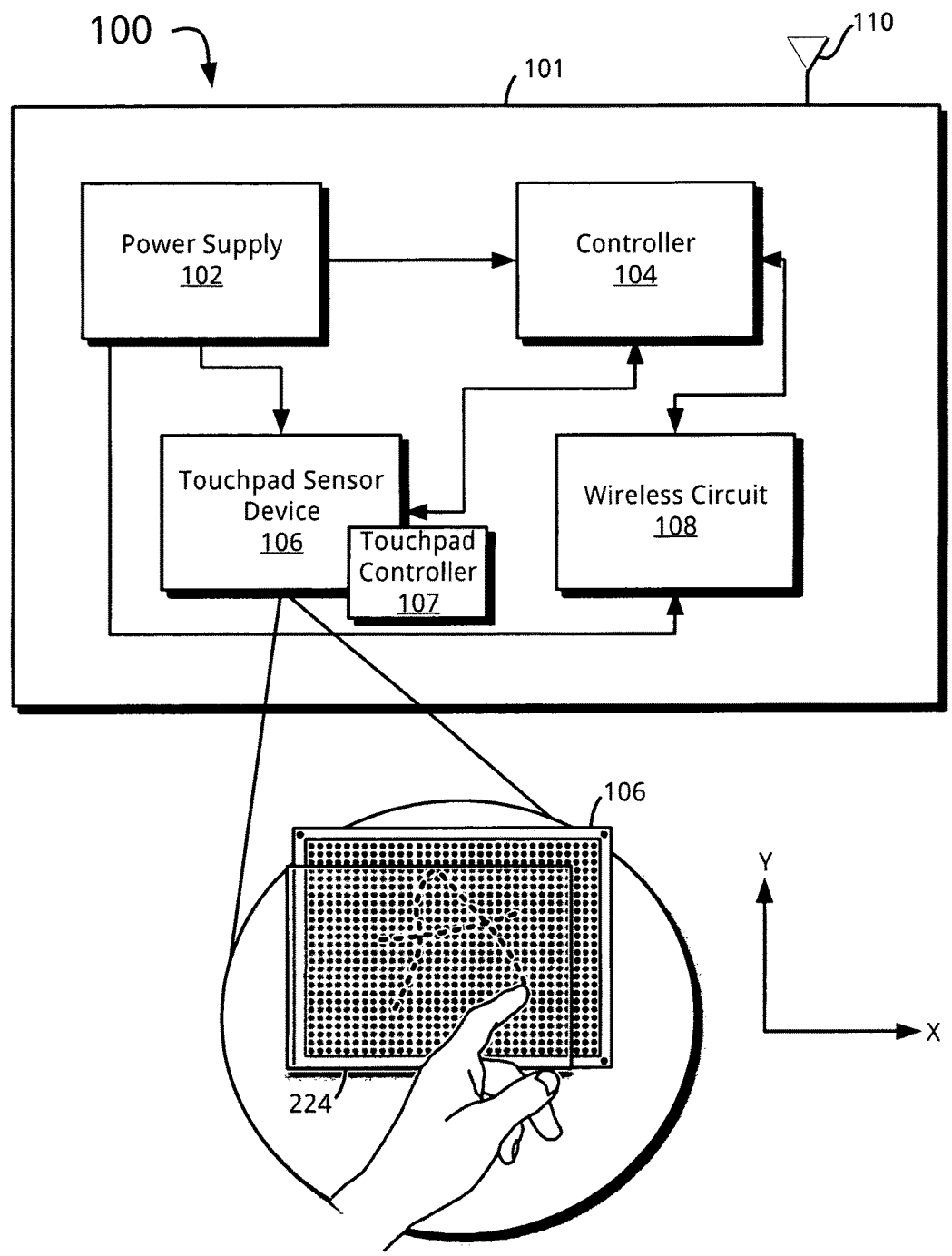
FIG. 1A illustrates a block diagram of an example touchpad system in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Providing aesthetically pleasing smart objects such as clothing and furniture while also providing conveniently accessible user interfaces to electronic systems integrated therein provides numerous non-trivial challenges. Some approaches include attaching standard keyboard devices (e.g., QWERTY) onto wrist bands, sleeves, gloves or other wearables such as smart watches. However, such approaches leave electrical components and associated wiring exposed, which may undesirably affect the aesthetic qualities of the host object. Other approaches include using specialized gloves with each finger having a corresponding identifier that allows a touch-sensitive device to uniquely identify input from individual fingers. However, a user is required to wear the specialized gloves to provide user input, and is limited to using only those devices compatible with the gloves. Still other approaches include shoulder-mounted projection-based keyboards whereby a keyboard is projected onto a surface and a sensor tracks user hand movements relative to the projected keyboard to determine input commands. Such approaches are not particularly well suited for everyday wear/use by a user as the shoulder-mounted components are conspicuous and potentially obtrusive and uncomfortable.

Thus, in accordance with an embodiment of the present disclosure, a touchpad system is disclosed herein that includes a touchpad sensor formed using flexible material layers and is at least partially integrated into a host article of clothing or a host furniture object such that the touchpad sensor is disposed beneath a layer of the host object, and thus is hidden or otherwise generally obscured from view. The touchpad sensor may be formed as a resistive or capacitive touchpad sensor, whereby user input is detected and converted into a proportional electrical signal. The touchpad sensor may include N layers of flexible materials configured to conduct electrical energy and also generally conform to various surface contours of a host object. For instance, a touchpad sensor disposed beneath a sleeve of a host article of clothing, such as a shirt or jacket, may generally "flex" to the extent necessary such that the touchpad sensor is unnoticeable or otherwise appears to substantially match the contours/shape of the sleeve material when worn by a user. The touchpad sensor may be configured to withstand multiple wash cycles which are generally characterized by repeated bending or crinkling of host clothing. Some example articles of clothing include, for instance, shirts, jackets, gloves, socks, pants, scarves, arm-bands, and headbands, just to name a few.

As generally referred to herein, the term "flexible" refers to materials that may be subject to loading conditions such as stretching, bending, rolling, twisting, and so on, without breaking or interrupting mechanical and electrical capabilities. Thus the touchpad sensor, being formed on a flexible substrate, may be subject to a wide variety of loading conditions while still providing a consistent and measurable electrical behavior. In an embodiment, the touchpad sensor disclosed herein may have a tensile strength of at least 30 megapascals (MPa), or more, depending on a particular implementation.

While specific examples disclosed herein may reference articles of clothing implementing the touchpad system, this disclosure should not necessarily be as construed as limited in this regard. For example, the touchpad sensor disclosed herein may be integrated into other objects such as furniture. Some example furniture types include couches (e.g., leather, fabric, etc.), chairs, and benches, just to name a few.

In an embodiment, formation of a touchpad sensor may include screen printing techniques to form one or more conductive layers of a touchpad sensor or circuit on a flexible substrate. For example, a sheet of flexible substrate such as polyethylene terephthalate (PET) or other suitable material may be coated with a conductive ink to provide at least one conductive layer. The conductive ink may include, for example, graphene, silver, or other suitable conductive metallic particle. When cured, the conductive coating may have a thickness of 0.0276 mils ($10^{-3}$ inches) or less and provide a resistance of about 5 ohms/square for a given conductive layer, although other resistance values are also achievable depending on a desired configuration. For example, the conductive ink may be configured to provide 3.5 ohms/square when deposited onto a flexible substrate. In any such cases, the resolution of the minimum feature size may be about 200 microns for a formed touchpad sensor, although other resolutions are also within the scope of this disclosure. Formation of the touchpad sensor may also include disposing the formed touchpad sensor beneath a layer of protective material of the host clothing/furniture. For example, the touchpad sensor may be disposed on an inner surface of a shirt sleeve, with the inner surface being proximal to the wearer's skin. Thus the touchpad sensor can integrate with host clothing/furniture without noticeably affecting the aesthetics of the host, as well as provide protection such that the touchpad sensor withstands a number of wash cycles.

In operation, the touchpad sensor may receive user input and convert the same to a proportional electrical signal. A touchpad controller of a touchpad system may receive the electrical signal and generate a digitized representation of the same to produce, for example, a decoded XY coordinate corresponding to the position of a user's touch relative to the conductive surfaces of the touchpad sensor. The XY coordinate may also be accurately referred to as a user-touch-point XY coordinate. In some cases, a plurality of XY coordinates may be delivered based on multi-touch gestures, with the multi-touch gestures including the detection of two or more fingers by the touchpad sensor. In some cases, the touchpad controller may also use the digital representation to determine a pressure value that represents the touch-pressure of the user's touch. In other cases, the touchpad controller may use the digitized representation to determine a proximity value that may indicate the presence of a user's finger, and the distance of that finger relative to the touchpad sensor. The touchpad controller may provide the user-touchpoint XY coordinate and optionally the associated pressure value or proximity value to a host controller communicatively coupled to a wireless transceiver circuit. The host controller may timestamp the received XY coordinate and transmit a touchpad event message including at least the XY coordinate and timestamp to a remote computing device.

In an embodiment, a remote computing device includes hardware or software, or any combination thereof, configured to receive one or more touchpad event messages and determine user input based on the same. In a general sense, the touchpad system may operate as a keyboard or other input device (e.g., a virtual keyboard/mouse) located on the user's person and may provide various types of input to manipulate operation of the remote computing device. For example, the touchpad system may detect user input such as characters, words, or symbols based on a user "penning" or otherwise tracing the user input onto the touchpad sensor with, for example, a gloved/ungloved finger, or a stylus. The touchpad system may then send user-touchpoint XY coordinates and associated timestamps corresponding to the user input as a plurality of touchpad event messages to the remote computing device. This communication may occur over, for example, a Bluetooth low-energy (BLE) connection/link formed between a Bluetooth transceiver device of the touchpad system and a Bluetooth transceiver of the remote computing device. In turn, the remote computing device may analyze the plurality of touchpad event messages to recognize and determine character or symbol equivalents by examination of the user-touchpoint XY coordinates and associated timestamps. In some cases, the remote computing device may use handwritten character recognition techniques. The remote computing device may use the determined characters or symbols as input in, for example, word processing applications, chat applications, login screens, and any other computer process that utilizes textual/symbol input.

However, it should be appreciated that the touchpad system is not necessarily limited to only character, word and symbol input. The touchpad system may also simulate or otherwise cause mouse events and other so-called "gesture" events. For example, the touchpad system may send one or more touchpad event messages that correspond to a "tap" gesture which the remote computing device interprets as a mouse-click event. In addition, a finger drag across the touchpad of the touchpad system may be interpreted as a mouse movement event by the remote computing system.

Alternatively, or in addition to mouse events, the touchpad system may send touchpad event messages that get interpreted as application-specific gestures by the remote computing device such as, for example, pinch/reverse-pinch (e.g., to zoom in and out, respectively), flick (e.g., next, back, and other application navigation commands), and scrolling gestures (e.g., page up, page down). Additional application-specific gestures may control music playback (e.g., pause, play, forward, back, stop, next/previous track), and may also provide remote control emulation. So the touchpad system may detect a wide range of user-input and represent the same via touchpad event messages, thus allowing a robust range of user actions to be determined and performed by a remote computing device. Likewise, the detected user-input may be particularly well suited for use in devices such as head-worn computing devices (e.g., eyeglass computers), wrist-worn devices (e.g., smart watches, fitness bands), video gaming systems, and toys that may be remotely controllable.

In one specific example embodiment, a touchpad system is implemented within a smart shirt or other smart wearable having at least one sleeve and an associated Bluetooth low-energy (BLE) transceiver. In this example, the touchpad system includes a touchpad sensor formed via one or more flexible materials and integrated with an inner layer of a sleeve. The touchpad system includes a touchpad sensor comprising at least one flexible substrate layer heat-sealed or otherwise bonded (e.g., using an adhesive) to the inner layer of the sleeve and configured to sense touch-based user input. A user wearing the smart wearable may manipulate a remote computing device such as a personal computer, smartphone, projector, or any other computing device by bringing a finger, stylus, or other such object into contact or otherwise in operable proximity with the touchpad sensor. The touchpad system may send one or more touchpad event messages to a remote computing device via the BLE transceiver, with each touchpad event message representing a decoded XY coordinate for the user contact and a timestamp corresponding to when the user contact occurred. In turn, the remote computing device may analyze the one or more touchpad event messages and execute a local action that, for example, advances a next slide in a slideshow application, executes a keyboard action (e.g., a key-press). In one specific sequence of user events, a user may utilize their sleeve, and more particularly the touchpad sensor at least partially integrated and hidden therein, to write a character string such as "OK" or "See you soon" and issue a "tap" or other gesture via the touchpad sensor in order to cause the remote computing device send the character string as a text message (SMS) or email to an intended recipient.

Thus the touchpad system disclosed herein provides numerous advantageous over other approaches to smart clothing input/control devices. For example, a user may wear a smart device and fully conceal the touchpad system such that the aesthetics of the wearable are unaffected. To this end, a smart wearable may appear to be "normal," and also provide convenient user-access to a touchpad that can robustly handle a wide variety of user-input in order to control and manipulate the operation of a remote computing device. Likewise, the touchpad system may be integrated into smart furniture in a hidden manner, such as within a couch, chair, or bench, for example.

Example Touchpad System and Operation

Various embodiments disclosed herein are directed to a touchpad system including a touchpad sensor at least partially integrated into a layer of fabric, textile or other base material of an article of clothing, furniture, or other object comprising flexible base material layers. Now turning to the figures, FIG. 1A illustrates one such example touchpad system 100, in accordance with an embodiment of the present disclosure. As shown, the touchpad system 100 includes a housing 101, a power supply 102, a controller 104, a touchpad sensor 106 or circuit, a wireless transceiver circuit 108, and an antenna device 110. Also shown is an optional protective material layer 224. As should be appreciated, FIG. 1A depicts the touchpad system 100 in a highly simplified form and that different variations and permutations are also within the scope of the present disclosure.

The housing 101 may comprise various physical form factors and styles including, for example, flexible materials that provide suitable protection of circuits and other components disposed within while being substantially unobtrusive to a user wearing the touchpad system 100. In some cases, the housing 101 is two or more separate portions. For instance, a first portion of the housing 101 may include the touchpad sensor 106 and associated wiring, while a second portion of the housing 101 may include the other components of the touchpad system 100. Dividing the touchpad system 100 in this manner may advantageously allow some components like batteries associated with the power supply 102 to get disposed in hidden/other areas such as pockets, while also providing the touchpad sensor 106 in a user-accessible region such as shirt sleeve, for example.

As generally referred to herein, the term "unobtrusive" generally refers to the touchpad system 100 being relatively unnoticeable by a user both physically and visually when integrated into a host article of clothing or a furniture object. The touchpad system 100 may achieve this, in part, by the one or more particular materials chosen to form components of the touchpad system 100. For example, the one or more particular materials chosen for the touchpad sensor 106 may include materials that generally match the look (e.g., color and design), feel (e.g., texture), flexibility, thickness, and density of the host clothing/furniture. Thus the impact of the touchpad sensor 106 on a host's particular look and feel may be minimized or otherwise mitigated.

The power supply 102 may comprise, for example, one or more power sources capable of providing suitable power (Vcc) to the controller 104, the touchpad sensor 106, the wireless transceiver circuit 108, and the antenna device 110. For example, the power supply 102 may include one or more batteries and associated circuitry configured to provide direct current (DC) to the components of the touchpad system 100.

The controller 104 may comprise, for example, a Complex Instruction Set Computer (CISC), a field-programmable gate array (FPGA), Reduced Instruction Set Computer (RISC) processor, x86 instruction set processor, multicore, microcontroller, an application-specific integrated circuit (ASIC), or central processing unit (CPU). In some embodiments, the controller 104 may comprise dual-core processor(s), dual-core mobile processor(s), and so on. The controller 104 can include storage (not shown) such as non-volatile storage devices including flash memory and/or volatile storage devices such as Random Access Memory (RAM), Dynamic Random Access Memory (DRAM), and Static Ram (SRAM). The controller 104 may include or otherwise receive instructions that when executed cause one or more touchpad processes to be carried out, such as the method 600 described below with respect to FIG. 6. In any event, the processes variously disclosed herein may be implemented, for example, using software (e.g., C or C++ executing on the controller/processor), hardware (e.g., hard-coded gate level logic or purpose-built silicon) or firmware (e.g., embedded routines executing on a microcontroller), or any combination thereof.

The touchpad sensor 106 may comprise, for example, a resistive or capacitive touchpad sensor, as further discussed below. In resistive touchpad scenarios, various embodiments are directed to configurations including, but not limited to, 4, 5, 6, 7 or 8-wire configurations. The touchpad sensor 106 may also include a touchpad controller 107 configured to receive and decode touchpoint detected input positions (e.g., XY coordinates) and pressure/proximity values. In some cases, the touchpad sensor 106 couples to the touchpad controller 107 via one or more flexible printed circuits (FPCs). The touchpad controller 107 may include hardware, software, or a combination thereof, configured to receive a signal representative of user input from the touchpad sensor 106 and provide a digital representation of the same to the controller 104. For example, the touchpad sensor 106 may output a voltage or other signal representative of input received from a user. In turn, the touchpad controller 107 may include conditioning circuitry such as filters and analog-to-digital (ADC) converters capable of digitizing the voltage or other signal received from the touchpad sensor 106, and may provide the digitized signal to the controller 104.

The touchpad controller 107 may be constructed similarly to that of the controller 104, and to this end, any of the aforementioned enumerated options for the controller 104 are equally applicable to the touchpad controller 107. Further note that the controller 104 and the touchpad controller 107 are not necessarily separate components, such as shown. For example, the controller 104 and the touchpad controller 107 may physically manifest as a single integrated circuit (IC). Moreover, note that the combination of components such as the touchpad controller 107, the controller 104, and the wireless transceiver circuit 108 may be housed within a single system-on-chip (SoC) device.

The wireless transceiver circuit 108 may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the wireless transceiver circuit 108 may operate in accordance with one or more applicable standards in any version. To this end, the wireless transceiver circuit 108 may include, for instance, hardware, circuits, software, or any combination thereof that allows communication with external computer systems.

In some specific non-limiting examples, the wireless transceiver circuit 108 comports with the IEEE 802.11 (e.g., Wi-Fi), Bluetooth, low-energy Bluetooth (BLE), ZigBee, near-field communication, or any other suitable wireless communication standard. In addition, the wireless transceiver circuit 108 may comport with cellular standards such as 3G (e.g., EV-DO, W-CDMA) and 4G wireless standards (e.g., HSPA+, WIMAX, LTE).

Figure 1B:
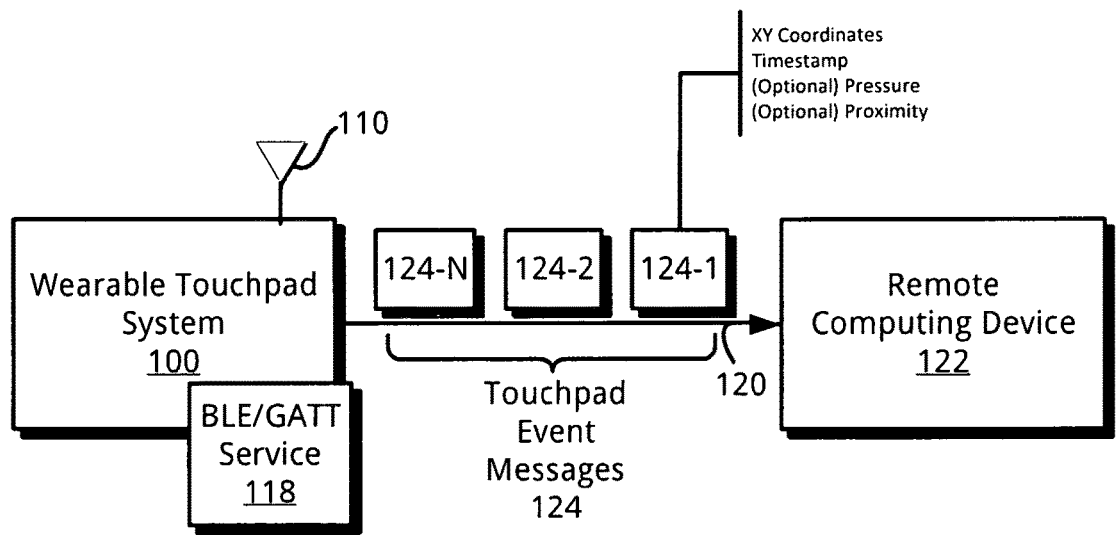
FIG. 1B illustrates the example touchpad system of FIG. 1A configured to communicate via a Bluetooth low-energy (BLE) link with a remote computing device, in accordance with an embodiment of the present disclosure.

Now referring to FIG. 1B, with additional reference to FIG. 1A, a block diagram illustrates the example touchpad system 100 configured to wirelessly communicate with a remote computing device 122, in accordance with an embodiment of the present disclosure. As shown, the touchpad system 100 comprises a BLE configuration, and includes a generic attribute profile (GATT) service 118, as shown. In an embodiment, the remote computing device 122 may comprise the computing device 800 of FIG. 8. The remote computing device 122 may include or otherwise receive instructions that when executed cause one or more touchpad processes to be carried out, such as the method 700 described below with respect to FIG. 7.

In some cases, the GATT service 118 uses a generic data protocol called the attribute protocol (ATT) to communicate with the remote computing device 122. However, it should be appreciated that the touchpad system 100 can utilize other wireless standards and protocols to communicate with the remote computing device 122 and is not necessarily limited to Bluetooth. For instance, the wireless protocol 120 may be an 802.11X (Wi-Fi) protocol, as discussed above.

In use, the touchpad system 100, and more particularly, the touchpad controller 107, receives a signal representing user-input from the touchpad sensor 106. The signal may comprise an analog signal having a voltage level that indicates a particular position of the received user-input. The user-input may include, for example, a user's finger(s) in contact or otherwise within detectable proximity of the touchpad sensor 106. The touchpad controller 106 then may digitize the received signal and provide the same to the controller 104. The digitized user-input signal may include an identifier of a coordinate using, for instance, a Cartesian coordinate system. For example, the coordinate identifier may include an X and a Y coordinate that correlates the user's finger to a particular position of the touchpad sensor 106. In the event of a multi-touch event, a plurality of decoded XY coordinates may be provided.

Figure 3A:
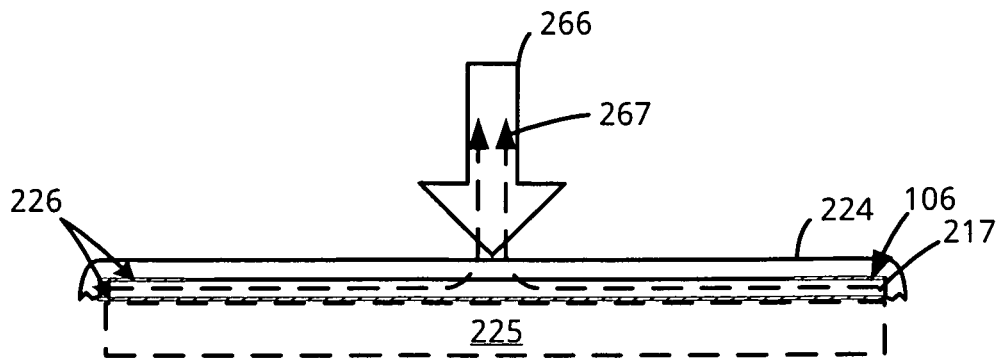
FIG. 3A shows a cross-sectional view of an example capacitive touchpad sensor, in accordance with an embodiment of the present disclosure.
Figure 4A:
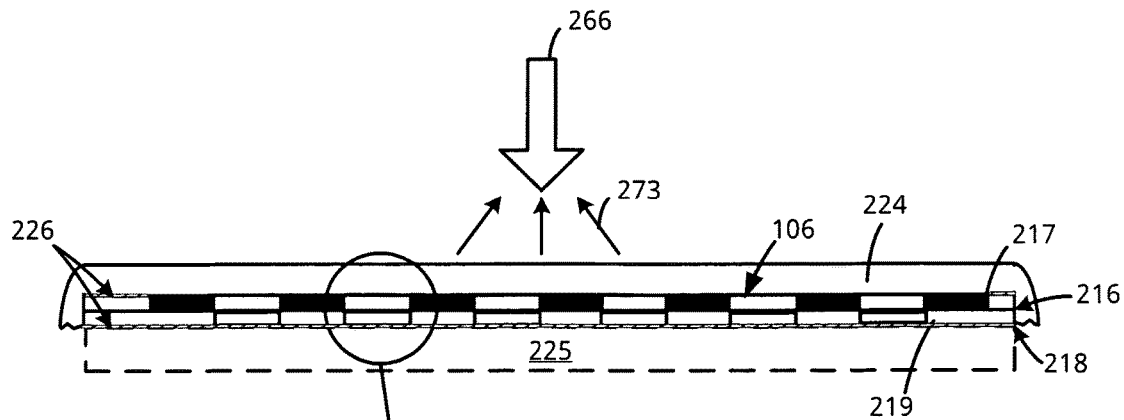
FIG. 4A shows a cross-sectional view of an example projected capacitive touchpad sensor, in accordance with an embodiment of the present disclosure.

In addition, the digitized user-input signal may include an associated touch pressure value or proximity value, or both. For example, the touchpad controller 107 may determine the amount of touch pressure by analyzing a current measurement in the signal received from the touchpad sensor 106. Thus the touchpad controller 107 may convert the measured current into a value that reflects the degree of touch pressure applied from 0% to 100%, for example. In addition, the touchpad sensor 106 may comprise a capacitive-sensing touchpad, such as shown in FIGS. 3A and 4A, and include the capability of detecting proximity of a user's finger relative to the touchpad sensor 106, without necessarily having direct or indirect contact (e.g., through a fabric or base material layer). In this case, the touchpad controller 107 may generate an associated proximity value based on the received signal from the touchpad sensor 106 that provides an indication of distance between the user's finger and the touchpad sensor 106.

In any such cases, the controller 104 may receive the digitized user-input signal (e.g., the XY coordinate(s)) and optionally at least one of the associated pressure and proximity values. In an embodiment, the controller 104 may generate a timestamp in response to receiving the digitized user-input signal. The timestamp may be generated based on, for example, output from a dedicated hardware or software clock within the controller 104. Also note that the touchpad controller 107 may generate the timestamp and provide the same to the controller 104. In any such cases, and as discussed below, the remote computing device 122 may use the generated timestamps to analyze a plurality of digitized user-input signals to recognize a pattern based at least in part on an associated temporal relationship.

Continuing with FIG. 1B, the touchpad system 100, and more particularly the controller 104, may generate a plurality of touchpad event messages collectively shown as 124, and individually shown as 124-1 to 124-N, in response to user input received by the touchpad sensor 106. Each touchpad event message 124-1 to 124-N may include, for example, an XY coordinate, a timestamp, an optional pressure value and an optional proximity value. As should be appreciated, user input may continually occur over a period time, and thus, the touchpad system may send a stream of corresponding touchpad event messages 124 to the remote computing device. Thus the frequency and rate of the stream of corresponding touchpad event messages 124 may vary relative to the occurrence of user input, and the particular type of user input received. For example, a finger tap on the touchpad sensor 106 may generate a single touchpad event message while a finger swipe across the touchpad sensor 106 may generate a plurality of touchpad event messages.

In any event, the remote computing device 122 may receive the plurality of touchpad event messages 124 via protocol 120 and process the same to determine or otherwise decipher user input. For instance, the remote computing device 122 may analyze the plurality of touchpad event messages 124 by examining XY coordinates and associated timestamps to determine a recognizable pattern. In some cases, the remote computing device may include an optical character recognition (OCR) process or handwriting recognition process that is configured to recognize one or more characters or symbols provided within the touchpad event messages 124. For example, as shown in FIG. 1A, a user sketched an uppercase letter "A" on the touchpad sensor 106 using their index finger. The corresponding plurality of touchpad event messages 124 received by the remote computing device 122 may contain each of the XY coordinates and timestamps for the touchpad event, and thus, allows the remote computing device 122 to traverse the plurality of touchpad event messages to ultimately detect the letter "A" as the desired/intended user input. Note that embodiments of the present disclosure are not necessarily limited to a single character and that multiple characters, words and symbols may also be represented and recognized within the plurality of touchpad event messages 124.

In addition to determining character/symbol input, the remote computing device 122 may associate or otherwise map operating system commands to recognizable patterns such as those caused by so-called "gesture" input. For instance, the remote computing device 122 may determine a user "swiped" a finger from left to right across the touchpad sensor 106 based on a particular pattern of XY coordinates and timestamps. In this instance, the remote computing device 122 may determine such a swipe is associated with a virtual keyboard command that simulates a spacebar button being pressed (e.g., to advance a slide in a slideshow application, or provided a space in word processing application), for example. Thus recognizable patterns/characters provided within one or more touchpad event messages may be mapped to operating system commands such that the touchpad system 100 operates as a virtualized mouse or keyboard, or both. As should be appreciated in light of this disclosure, numerous other gestures may be recognized and mapped to corresponding application/system functions. Some such examples gestures may include, for example, pinch gestures, scroll gestures, tap gestures or any other gesture that may be detected and quantified into one or more touchpad event messages.

As discussed above, the touchpad system 100 may provide a continuous stream of touchpad event messages 124, and the remote computing device 122 may buffer received touchpad event messages in a memory (not shown) and delay processing until, for instance, user inactivity is detected. The remote computing device 122 may determine inactivity based on, for instance, an inactivity message. In some cases, the touchpad system 100 includes a hardware/software timer that resets each time user input is detected. The timer may cause the touchpad system 100 to send an inactivity message to the remote computing device 122 based on a lack of detected user input over a predetermined period of time. Alternatively, or in addition to an inactivity message, the remote computing device 122 may also use a similar timer to determine a predefined period has elapsed since receiving a touchpad event message, thus suggesting inactivity.

Although the previous examples discuss OCR, handwriting and symbol recognition, other recognition schemes are also within the scope of this disclosure. For example, the remote computing device 122 may utilize predicative algorithms, heuristic analysis, or any suitable recognition approach. In an embodiment, the touchpad system 100 may implement a standard mouse/keyboard Bluetooth stack and simply operate as a HID compliant mouse/keyboard.

Note that in some cases the remote computing device 122 may be a device also located on a user's person, such as a portable electronic device. For instance, the remote computing device 122 may comprise, for instance, a portable music player (e.g., MP3) or smart phone configured to receive touchpad event messages from the touchpad system 100. The touchpad event messages may be received via a wireless connection, or a wired connection, depending on a desired configuration. In other cases, the remote computing device 122 may comprise a relatively non-portable computing system such as a computer workstation or a server computer.

Example Methods and Architecture

Figure 2A:
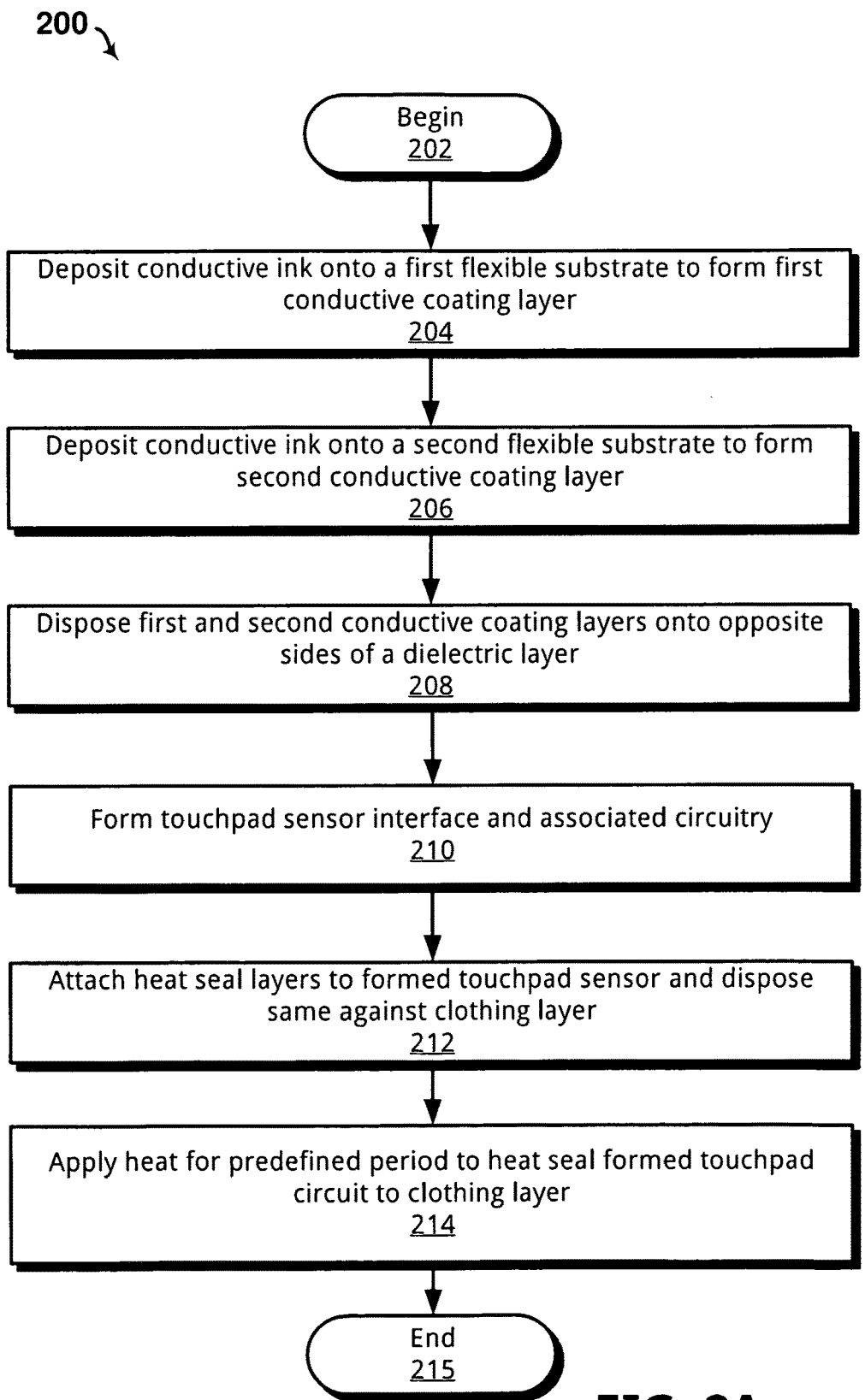
FIG. 2A shows one example method of forming a touchpad sensor at least partially integrated into a base material layer of an article of clothing or furniture object, in accordance with an embodiment of the present disclosure.

As previously discussed, various embodiments disclosed herein include a touchpad system configured to be at least partially integrated into a host object (e.g., clothing, furniture, etc.) such that the touchpad sensor is unobtrusive to the user and is partially, or completely, hidden from view. One example method 200 for forming and integrating a touchpad sensor into a host object is shown in FIG. 2A, in accordance with an embodiment disclosed herein. The example method 200 may be performed by a manufacturing process utilizing, for example, screen printing techniques capable of forming and integrating single-layer and multi-layer stack circuits onto a substrate.

Although the method 200 discussed below is directed to forming a projected capacitive touchpad sensor or circuit having multiple layers of conductive coating, other types of touchpad sensors and configurations are within the scope of this disclosure with minor modifications. For example, a single conductive coating layer may be provided when forming, for example, a single-layer capacitive touchpad. Likewise, resistive touchpad sensors may be formed by supplying one or more spacers between conductive coating layers, such as shown in the example touchpad sensor of FIG. 5. Thus, acts may be substituted, omitted, or otherwise modified depending on a desired touchpad sensor type and the method 200 is equally applicable to numerous device types and configurations. Method 200 begins in act 202.

In act 204, the manufacturing process deposits conductive ink onto a first flexible substrate 216 to form a first conductive coating layer 217. In some cases, this includes using a technique whereby a mesh/screen is used to transfer conductive ink onto the first flexible substrate 216, except in areas made impermeable to the conductive ink by a blocking stencil (not shown). A blade or squeegee moved across the mesh then causes open apertures of the mesh to fill with conductive ink, and a reverse stroke then causes the mesh to touch the first flexible substrate 216 momentarily along a line of contact. This may cause the conductive ink to wet or otherwise coat the first flexible substrate 216 and be pulled out of the mesh apertures as the screen housing the mesh springs back after the blade has passed. In an embodiment, the manufacturing process deposits the conductive ink such that a pattern of electrodes is formed, such as the pattern of electrodes 228 shown in FIG. 2H, and the pattern of electrodes 270 illustrated in FIG. 4B, for example. In this embodiment, the pattern of electrodes formed on the first flexible substrate 216 may be referred to as receive (Rx) electrodes. The first conductive coating layer 217 may be allowed to cure/dry for a period of time, and then the aforementioned process may be completed an additional number of times. Thus a particular target thickness for the first conductive coating layer 217 may be achieved.

Figure 2B:
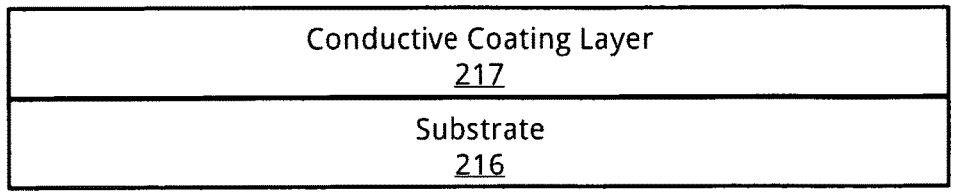
FIGS. 2B-2E respectively illustrate various example cross-sectional views of a capacitive touchpad sensor formed in accordance with various acts of the example method of FIG. 2A.

The first flexible substrate 216 may comprise a layer of PET or other suitable substrate as will be apparent in light of this disclosure. In an embodiment, the first flexible substrate 216 may have a tensile strength of at least 55 MPa. Referring to FIG. 2B an example cross-sectional view shows the first flexible substrate 216 with the first conductive coating layer 217 disposed thereon. As previously discussed, the conductive ink used to form the first conductive coating layer 217 may include graphene, silver, or other suitable material capable of conducting electrical energy. As should be appreciated, the first conductive coating layer 217 is illustrated with exaggerated dimensions for the purpose of clarity and is not necessarily the same thickness as the first flexible substrate 218.

Figure 4B:
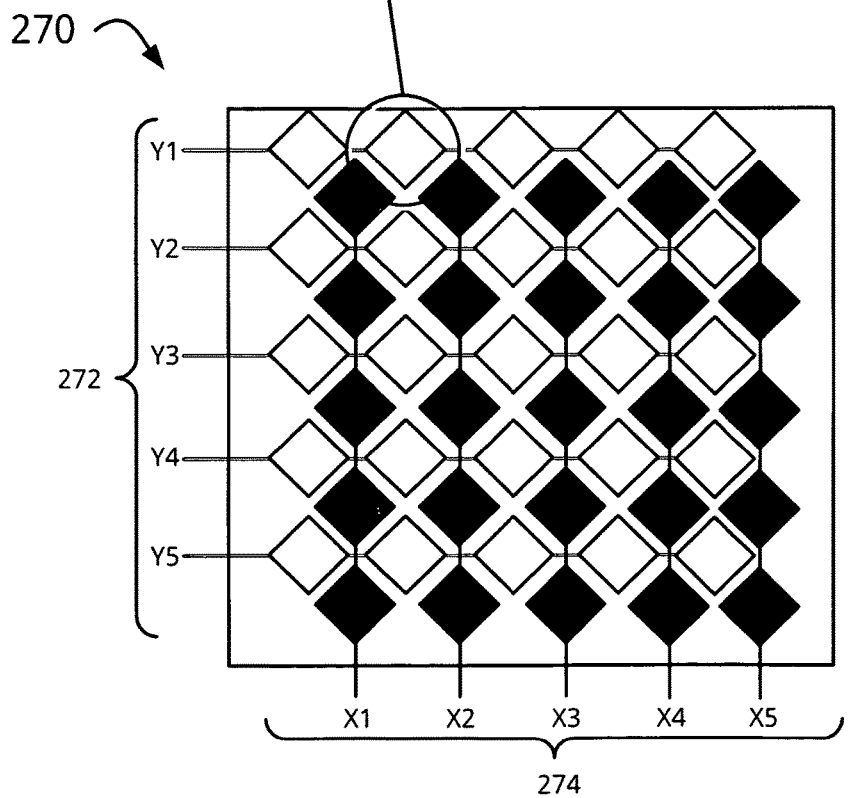
FIG. 4B shows a schematic view of the example projected capacitive touchpad sensor of FIG. 4A, in accordance with an embodiment of the present disclosure.

Returning to FIG. 2A, and in act 206, the manufacturing process deposits conductive ink onto a second flexible substrate 218 to form a second conductive coating layer 219. The second conductive coating layer 219 may be formed similar to that of the first conductive coating layer 217 as discussed above, which will not be repeated for the sake of brevity. The second conductive coating layer 219 may also be deposited in a manner that also forms an electrode pattern. The pattern of electrodes formed on the first flexible substrate 216 may be referred to as transmit (Tx) electrodes. As should be appreciated, the electrode pattern of the second conductive coating layer 219 may be configured such that they occupy the space between respective electrodes of the first conductive coating layer 217. For example, as shown in FIGS. 4A and 4B, the electrode pattern of the first conductive coating layer 217 may form columns of electrodes 274 and the electrode pattern of the second conductive coating layer 219 may form rows of electrodes 272, with the rows and columns of electrodes 272 and 274 collectively forming a checker pattern. As discussed below, the rows and columns of electrodes 272 and 274 form Rx and Tx circuits that allow for user input to be identified and localized based on the particular electrodes within proximity of the user's finger or other conductive pointing device in proximity with the touchpad sensor 106.

Figure 2C:
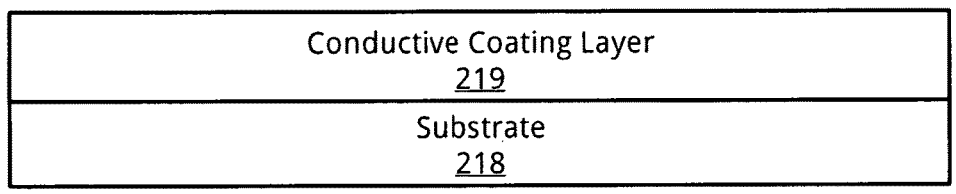

In an embodiment, second flexible substrate 218 may also comprise a layer of PET or other suitable substrate as will be apparent in light of this disclosure. In some cases, the second flexible substrate 218 has a tensile strength of at least 55 MPa. Referring to FIG. 2C an example cross-sectional view shows the second flexible substrate 218 with the second conductive coating layer 219 disposed thereon. As previously discussed, the conductive ink used to form the second conductive coating layer 219 may include graphene, or other suitable material capable of conducting electrical energy. As should be appreciated, the second conductive coating layer 219 is illustrated with exaggerated dimensions for the purpose of clarity and is not necessarily the same thickness as the second flexible substrate 218.

Figure 2D:
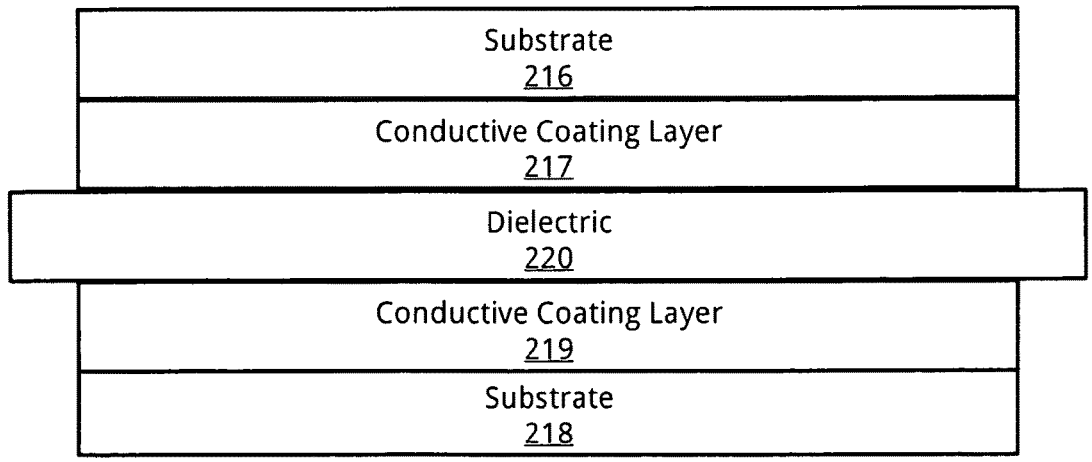

Returning to FIG. 2A, and in act 208, the manufacturing process disposes the first and second conductive coating layers 217 and 219 onto opposite sides of a dielectric layer 220. In an embodiment, this may include using an adhesive to fixedly attach the first and second conductive coating layers 217 and 219 to the dielectric. In another embodiment, this may include using wet conductive ink disposed of each of the first and second conductive coating layers 217 and 219 as an adhesive. The dielectric layer 220 may comprise, for example, a polyimide film such as Kapton. In other cases, the dielectric layer may comprise any other suitable material that allows for electrical isolation and material flexibility that may withstand breaking/fracturing when a force is applied that causes the material to bend. Referring to FIG. 2D, an example cross-sectional view shows the dielectric layer 220 having the first and second conductive coating layers 217 and 219, respectively, disposed on opposite sides.

Figure 2E:
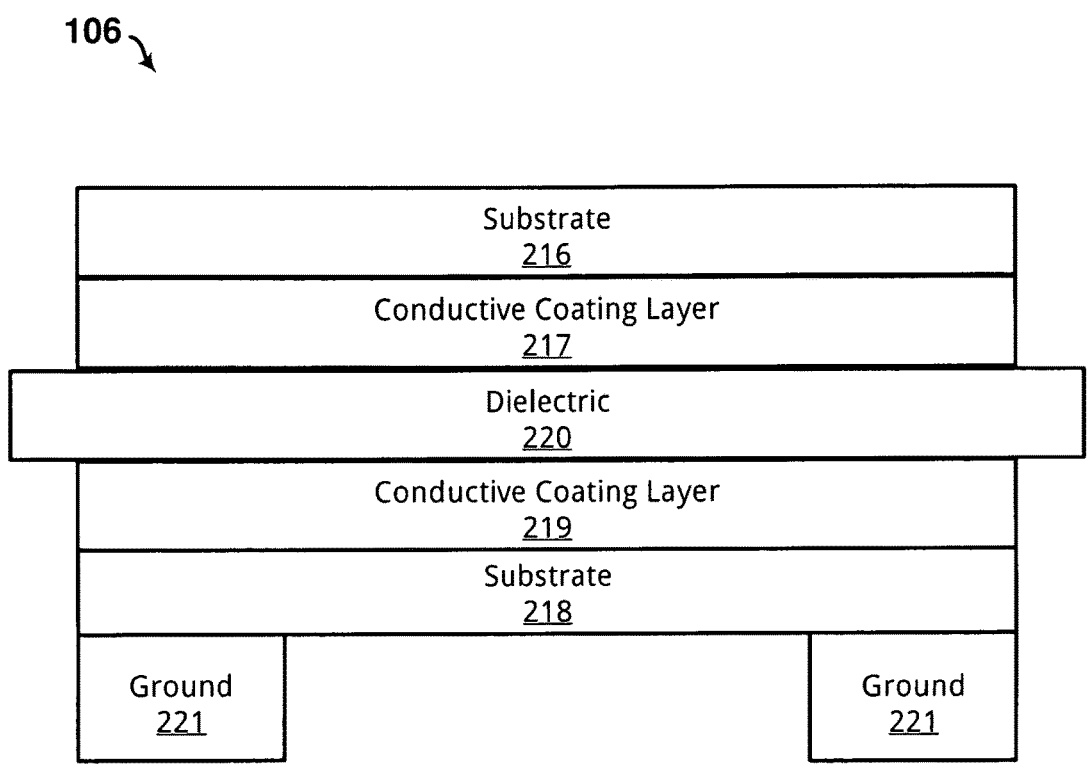

Returning to FIG. 2A, and in act 210, the manufacturing process forms the touchpad sensor 106 by providing and electrically coupling associated circuitry. For instance, the formed touchpad sensor 106 may include one or more flexible printed circuit boards, and conductive wires/paths configured to provide power and allow sensed user input to be decoded and provided to the touchpad controller 107. Referring to FIG. 2E, an example cross-sectional view shows a common ground line 221 formed at a base of the formed touchpad sensor 106. The common ground line 221 may be formed by, for example, the manufacturing process depositing a layer of conductive ink onto a bottom surface of the second flexible substrate 218. As should be appreciated, the formed touchpad sensor of FIG. 2E is highly simplified and may also include associated circuitry such as electrical interfaces (not shown) to the first and second conductive layers 217 and 219 and wires/conductive paths providing power (Vcc) from the power supply 102.

Figure 2F:
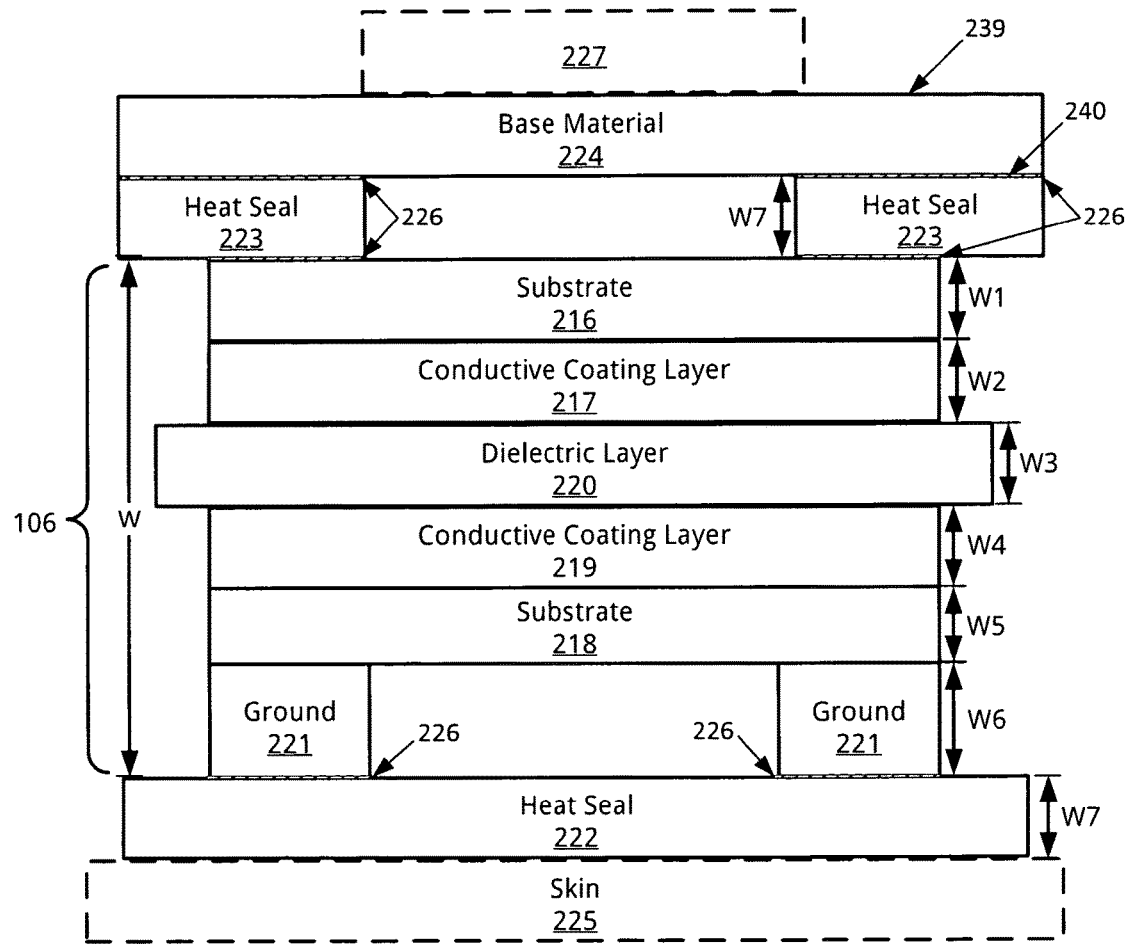
FIG. 2F shows a cross-sectional view of an example capacitive touchpad sensor formed and integrated into an article of clothing or furniture object, in accordance with the example method of FIG. 2A.
Figure 2G:
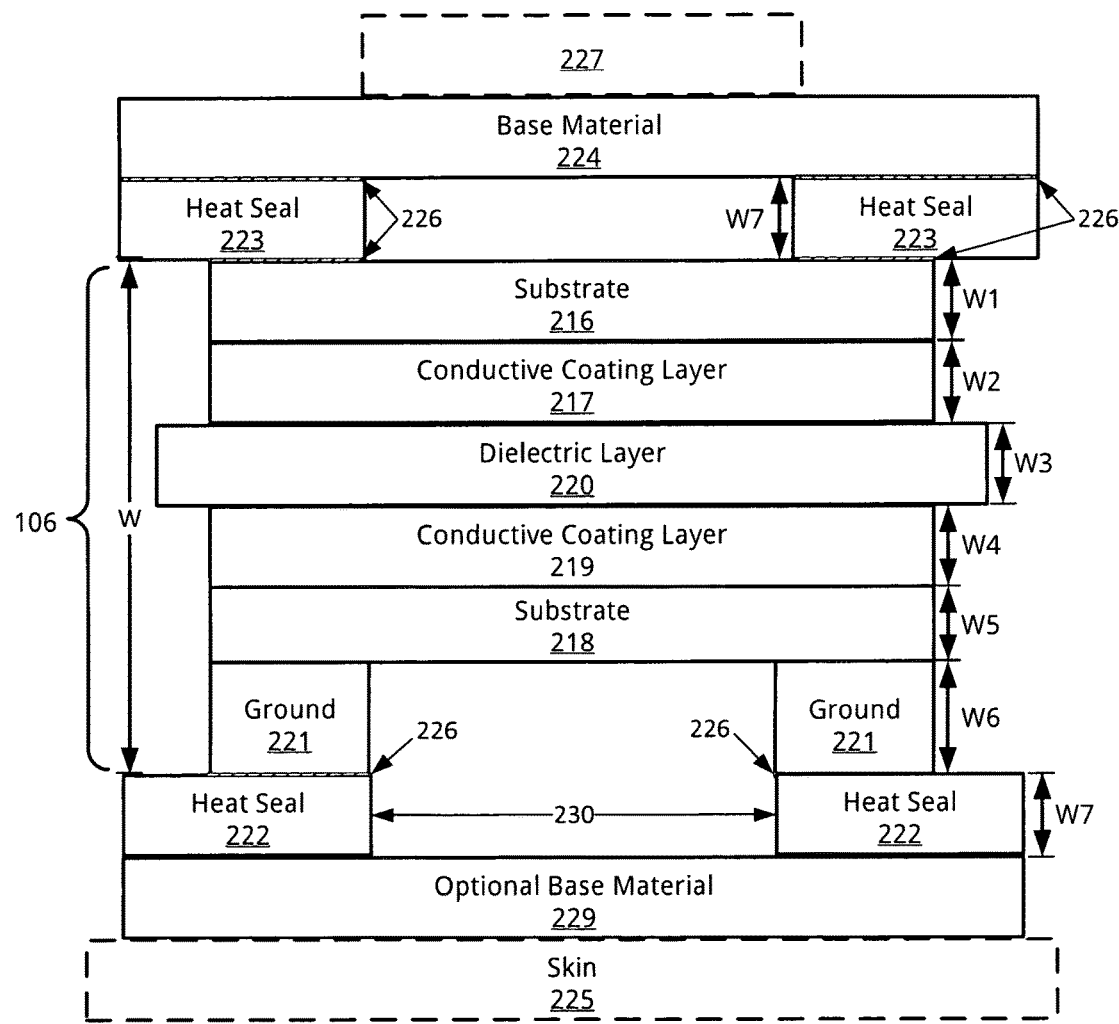
FIG. 2G shows cross-sectional view of another example capacitive touchpad sensor formed and integrated into a host article of clothing or furniture object, in accordance with the example method of FIG. 2A.

Returning to FIG. 2A, and in act 212, the manufacturing process attaches heat seal layer 223 to the formed touchpad sensor 106 and disposes the same against a layer of base material 224 or base material layer, such as shown in FIG. 2F. A second heat seal layer 222 may be disposed on a bottom surface of the common ground layers 221. In an embodiment, the heat seal layers 222 and 223 may comprise, for example, a monolayer or multi-layer material with at least one layer of thermoplastic material. The heat seal layer 223, when activated by suitable heat, may bind to the substrate 216 and the base material layer 224, such as shown in FIGS. 2F and 2G. Likewise, the heat seal layer 222, when activated by suitable heat, may bind to the common ground layers 221 and the optional base material layer 229, when present.

The base material layer 224 may include a first surface 239 or outer surface and a second surface 240 or inner surface. The base material 224 may comprise, for example, synthetic fibers such as nylon, acetate, acrylic, latex, polyester, rayon, just to name a few. Other non-limiting example fabrics include natural plant/animal fibers such as wool, silk, and cashmere. Still other non-limiting examples non-synthetic fiber includes leather, vinyl, and plastic. In some cases, the base material 224 comprises two or more different materials. Accordingly, the scope of the present disclosure encompasses a wide range of materials used in clothing, furniture, and other objects comprising similar materials, and is not necessarily limited to only those listed.

In act 214, the manufacturing process applies heat for a predefined period of time using a predefined amount of pressure to heat seal the formed touchpad sensor 106 with the base material layer 224. The particular length of time required to create a heat seal depends on the particular temperature of the heat element (or iron) and the size (e.g., surface area) of the formed touchpad sensor 106 or circuit, for example. In one specific example embodiment, heat sealing may be achieved in approximately two minutes by heating an element up to 300 degrees Fahrenheit and applying the heated element directly or indirectly for approximately two minutes. Applying the heating element may include exerting a force of about 100 pounds of pressure on to the base material 224 to ensure a substantially permanent bond is formed with the formed touchpad sensor 106. The method 200 ends in act 215.

FIG. 2F shows an example cross-sectional view of the touchpad sensor 106 after a heat sealing process is performed. As shown, the touchpad sensor 106 includes a plurality of bonded regions 226. The bonded regions 226 may fixedly attach the first flexible substrate 216 and the base material 224 to the heat seals 223. Likewise, the bonded region 226 at a bottom side of each of the common ground layers 221 may fixedly attach the same to the heat seal layer 222. To this end, the base material 224 and the formed touchpad sensor 106 may form essentially a monolithic structure. The base material 224 may comprise a portion of a shirt sleeve that covers the skin 225 of the wearer's arm, for example.

In an embodiment, the formed touchpad sensor 106 may have a total thickness/width W of 8 mils ($10^{-3}$ inches) or less. The heat seals 223 and 222 may each respectively comprise a thickness/width W7 of 4 mils or less. Thus, and in accordance with an embodiment, the overall thickness from skin 225 to base material 224 may be about 16 mils (8 mils+4 mils+4 mils). In more detail, the first and second conductive coating layers 217 and 219 may have a width W2 and W4 of about 0.2756 mils or less, respectively, although other widths are within the scope of this disclosure. The width W2 may be the same or different from that of the width W4. The first and second flexible substrates 216 and 218 may have a width W1 and W5 of about 2 mils or less, respectively, although other widths are within the scope of this disclosure. The dialectical layer 220 may have a width W3 of about 2 mils or less, although other widths are within the scope of this disclosure. The common ground layers 221 may have a width W6 of about 1.344 mils or less, although other widths are within the scope of this disclosure.

Figure 2H:
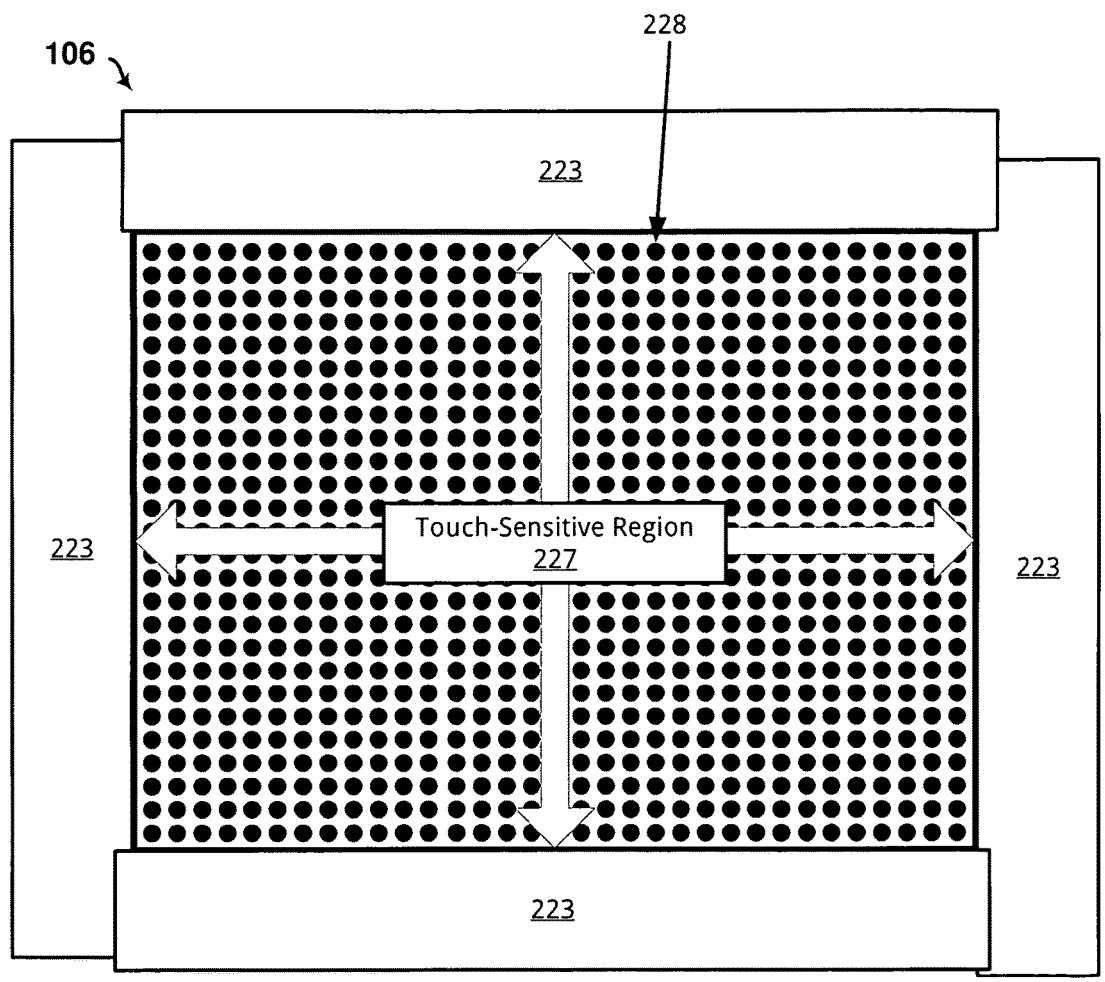
FIG. 2H shows a top plan view for a plurality of heat seal layers disposed on a touchpad sensor and a touch-sensitive region located there between, in accordance with an embodiment of the present disclosure.

In an embodiment, the touch-sensitive region 227 is an area that occupies generally the space between heat seals 223. For example, as shown in FIG. 2H, the touch-sensitive region 227 occupies an area between the heat seals 223. As should be appreciated, the touchpad sensor 106 is illustrated with the base material layer 224 removed.

FIG. 2G shows another example cross-sectional view of the touchpad sensor 106 after a heat sealing process is performed, in accordance with an embodiment of the present disclosure. As should be appreciated, the example embodiment shown in FIG. 2G is substantially similar to that of the embodiment shown in FIG. 2F, except for a reduced size heat seal 222 with an air gap 230. In addition, the example embodiment shown in FIG. 2G includes an optional base material layer 229 formed at a base of the touchpad sensor 106. The optional base material layer 229 may comprise a material similar to that of the base material layer 224, and thus may comprise one or more of the aforementioned synthetic/non-synthetic material types.

Figure 6:
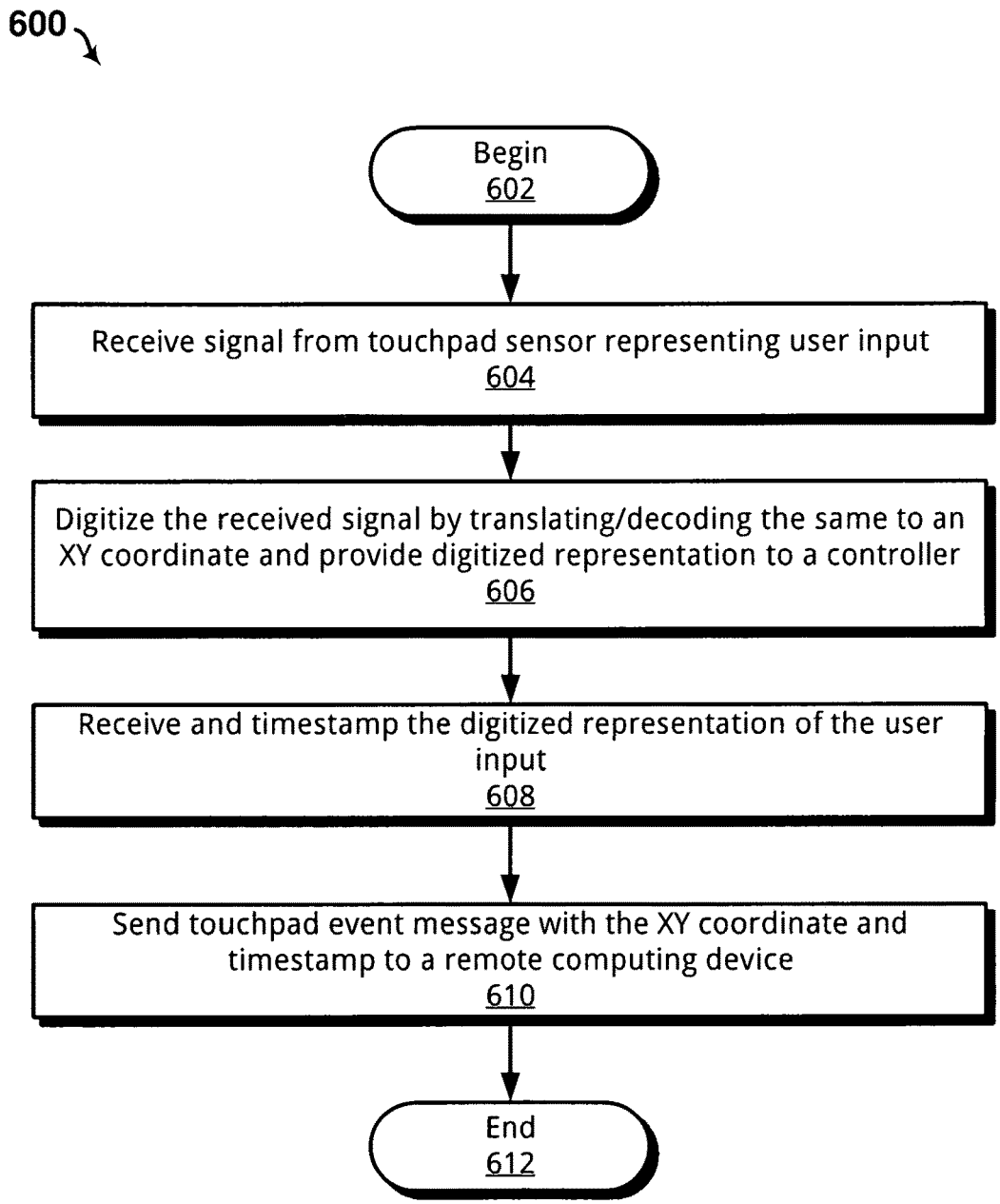
FIG. 6 shows an example method for detecting user input via the touchpad system of FIG. 1A, and sending representation of the same to a remote computing device, in accordance with an embodiment of the present disclosure.

Turning to FIG. 6, an example method 600 detecting user input via the touchpad sensor 106 and sending a representation of the same to a remote computing device is shown. Method 600 begins in act 602.

In act 604, the touchpad controller 107 receives a signal from the touchpad sensor 106 representing user input. In act 606, the touchpad controller 107 digitizes the received signal by translating the same into an XY coordinate and provides the same to the controller 104. In an embodiment, the received signal may include single-touch, or multi-touch user-input.

In turn, and in act 608, the controller 104 receives the digitized representation of the user input and generates a corresponding timestamp. In act 610, the controller sends a touchpad event message with at least the XY coordinate and timestamp to the remote computing device 122 via, for example, ATT over a BLE connection. The method 600 ends in act 612.

Figure 7:
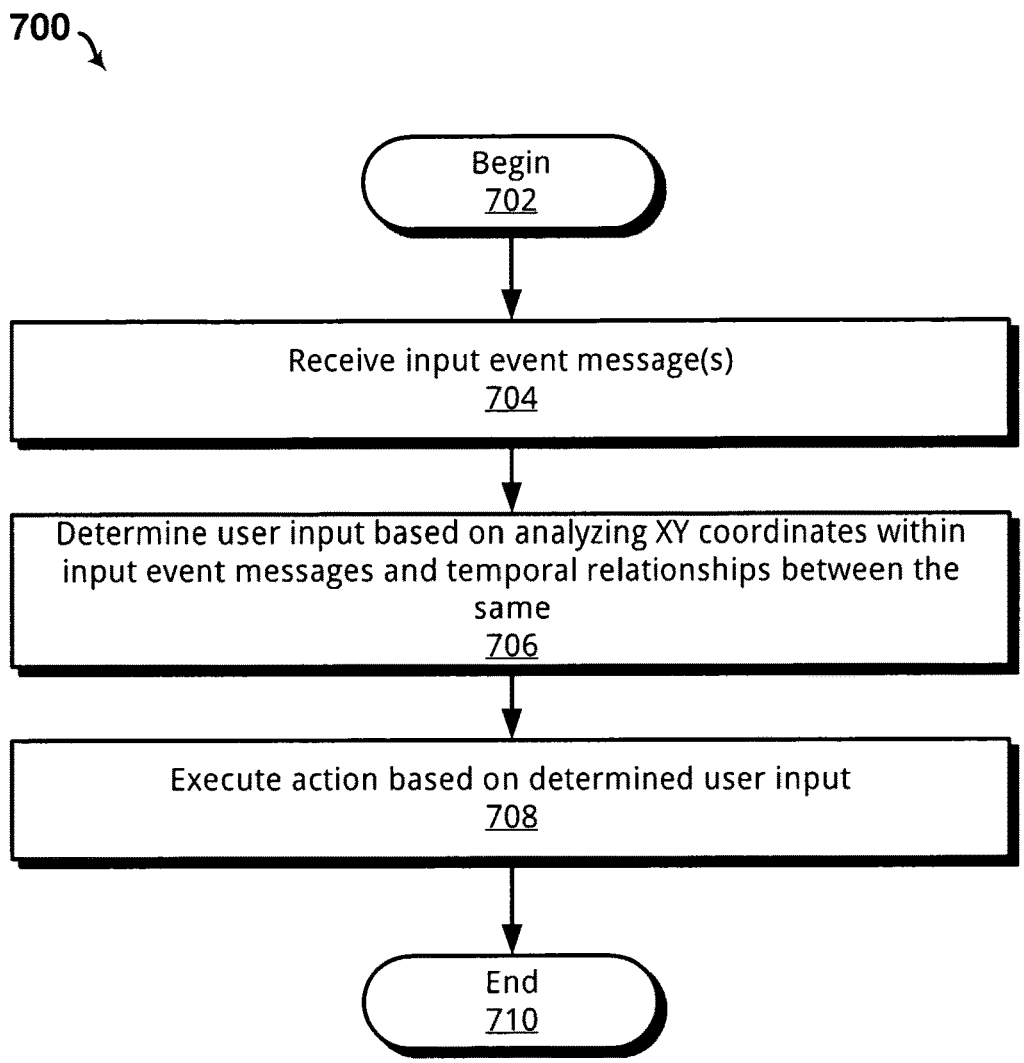
FIG. 7 shows an example method for receiving and analyzing user touchpad event messages from the touchpad system of FIG. 1A in order to determine user input and execute actions based on the same, in accordance with an embodiment of the present disclosure.

Turning to FIG. 7, an example method 700 for analyzing one or more received touchpad event messages to determine user input therefrom is shown. Method 700 begins in act 702.

In act 704, the remote computing system 122 receives one or more touchpad event messages from the touchpad system 100. In act 706, the remote computing device 122 determines user input based on analyzing XY coordinates within touchpad event messages and temporal relationships between the same based on associated timestamps. For example, the remote computing device 122 may use predicative algorithms, OCR, handwriting recognition, heuristic analysis, or any other suitable recognition process alone or in combination. In act 708, the remote computing system 122 executes an action such as a mouse-click, mouse-move command, keyboard command, music control, remote control emulation, or other action based on the user input determined in act 706. The method 700 ends in act 710.

Example Touchpad Sensors

As previously discussed, the touchpad sensor 106 may comprise various types of touchpad sensors such as, for example, capacitive or resistive touchpad sensors. Capacitive touchpads sense minor changes in electrical current generated by contact with a finger, or changes in electrostatic capacity (e.g., load). Each of the following example touchpad sensors are shown in a highly simplified form and may include additional components and associated circuitry not included merely for practicality. For instance, each example touchpad sensor 106 may include interface wires and one or more FPCs. Moreover, it should be understood that each of the cross-sectional views of the touchpad sensor 106 illustrated in FIGS. 3A-4B are shown in a collapsed manner such that the touchpad sensor 106 is represented by a single layer merely for clarity and practicality.

Figure 3B:
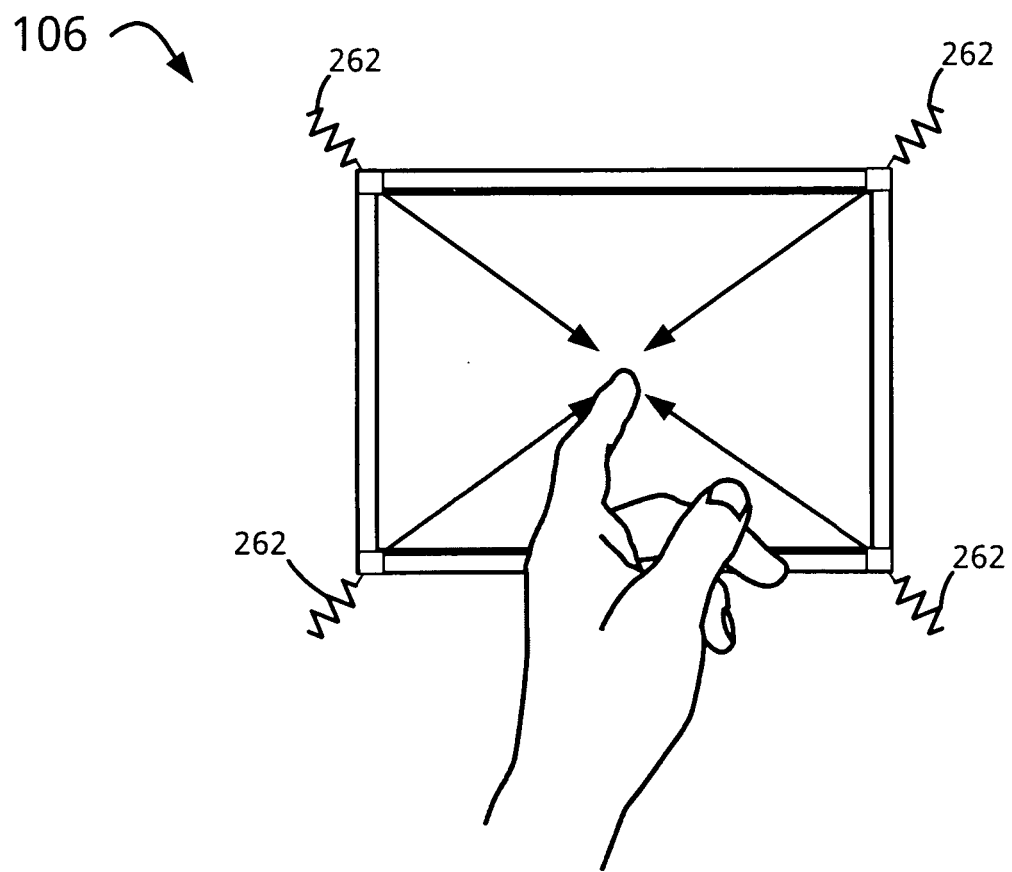
FIG. 3B shows a schematic view of the example capacitive touchpad sensor of FIG. 3A, in accordance with an embodiment of the present disclosure.

FIG. 3A shows an example touchpad sensor 106 formed as a capacitive-type touchpad and at least partially integrated with a base material layer 224 in accordance with the method 200 of FIG. 2A. The example touchpad sensor 106 may also be accurately referred to as a surface capacitive touchpad. As shown, the surface capacitive touchpad sensor 106 includes a single conductive coating layer 217, with intermediate layers (e.g., substrate 216) omitted merely for clarity. As previously discussed, the base material layer 224 may be at least a portion of an article of clothing or a furniture object. As shown in FIG. 3B, the surface capacitive touchpad sensor 106 includes associated circuitry including a plurality of electrodes 262 coupled to each corner of the capacitive touchpad sensor 106.

In use, the power supply 102 provides a voltage to the electrodes 262, which causes the plurality of electrodes 262 to generate a uniform low-voltage electrical field across the touchpad sensor 106. Thus when a conductor 266 approaches, such as a finger, the capacitive touchpad sensor 106 identifies the position of the conductor 266 by measuring changes in electrostatic capacity. This change in electrostatic capacity occurs, in part, based on the load created by the conductor that draws current 267. The touchpad sensor 106 may measure these changes and provide the same as a decoded signal to the touchpad controller 107, which ultimately may provide a representation of the user input as a touchpad event message to a remote computing device.

FIG. 4A shows another example touchpad sensor 106 formed as a projected capacitive-type touchpad and integrated with a base material layer 224 in accordance with the method 200 of FIG. 2A. The example touchpad sensor 106 of FIG. 4A may also be accurately referred to as a projected capacitive touchpad, and may be configured to detect multi-touch gestures by a user. As shown, the projected capacitive touchpad 106 includes at least a first conductive coating layer 217 and a second conductive coating layer 219 disposed on a surface of the first and second flexible substrates 216 and 218, respectively. The first flexible substrate 216 may be coextensive with the second flexible substrate 218. As also shown, the first and second conductive coating layers 217 and 219 may collectively form an electrode pattern 270, such as shown in FIG. 4B.

FIG. 4B shows one example electrode pattern 270 in accordance with an embodiment of the present disclosure. As shown, the electrode pattern 270 includes an NxM array or matrix of electrodes organized into a plurality of rows 272 and columns 274. Although the electrode pattern is illustrated as a 5×5 array, other array patterns are also within the scope of this disclosure. For instance, the electrode pattern may comprise a 10×10, 128×128, or 256×256 array of electrodes. Likewise, electrode shape and size may be application-specific and may vary depending on a desired configuration. The electrode pattern 270 may have a minimum predefined feature size of about 200 microns, although other features sizes are within the scope of this disclosure.

In use, the electrode pattern 270 generates uniform electrostatic field 273 based on a voltage applied from the power supply 102. When the conductor 266 (e.g., a finger) comes into contact with the electrostatic field 273, the touchpad sensor 106 measures changes/disruptions thereto. In particular, the changes manifest as a change in capacitance as the conductor 266 bridges the gap between two "tracks" formed by electrodes in the rows 272 and the columns 274. The touchpad sensor 106 may measure these changes at every individual point on the grid (e.g., each intersection of electrodes of the rows 272 and the columns 274) and provide the same as a signal to the touchpad controller 107, which ultimately may provide a representation of the user input as a touchpad event message to a remote computing device.

Figure 5:
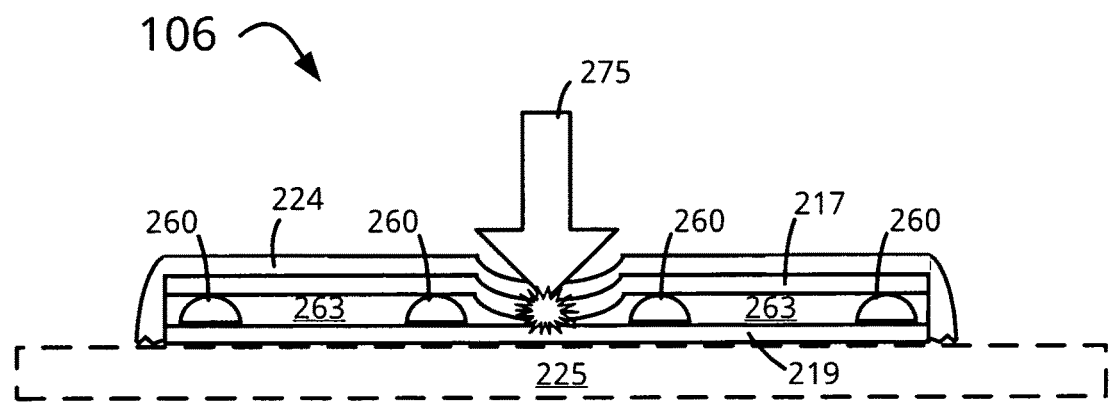
FIG. 5 shows a cross-sectional view of an example resistive touchpad sensor, in accordance with an embodiment of the present disclosure.

Turning to FIG. 5, an example touchpad sensor 106 formed as a resistive-type touchpad and at least partially integrated with a base material layer 224 in accordance with the method 200 of FIG. 2A is shown. As previously discussed, various embodiments disclosed herein are applicable numerous configurations including, but not limited to, 4, 5, 6, 7 or 8-wire configurations. Thus the particular configuration shown should not be construed as limiting the present disclosure.

As shown, the first conductive coating layer 217 is disposed adjacent the base material layer 224. A plurality of spacers 260 is disposed along a bottom surface of the first conductive coating layer 217. The second conductive coating layer 219 is disposed beneath the plurality of spacers 260 such that air gaps 263 are formed. The second conductive coating layer 219 may be coextensive with the first conductive coating layer 217.

In use, a finger 275 or other object (e.g., a stylus) coming into contact with the touchpad sensor 106 depresses the base material layer 224 causing the first and second conductive coating layers 217 and 219 to come into contact or otherwise close proximity. To this end, a switch is effectively closed whereby current flows between the first and second conductive coating layers 217 and 219, which when measured allows the touchpad sensor 106 to decode/determine the position of the input. The touchpad sensor 106 may measure the change in current and provide the same as a signal to the touchpad controller 107, which ultimately may provide a representation of the measured user input as a touchpad event message to a remote computing device.

Example System

Figure 8:
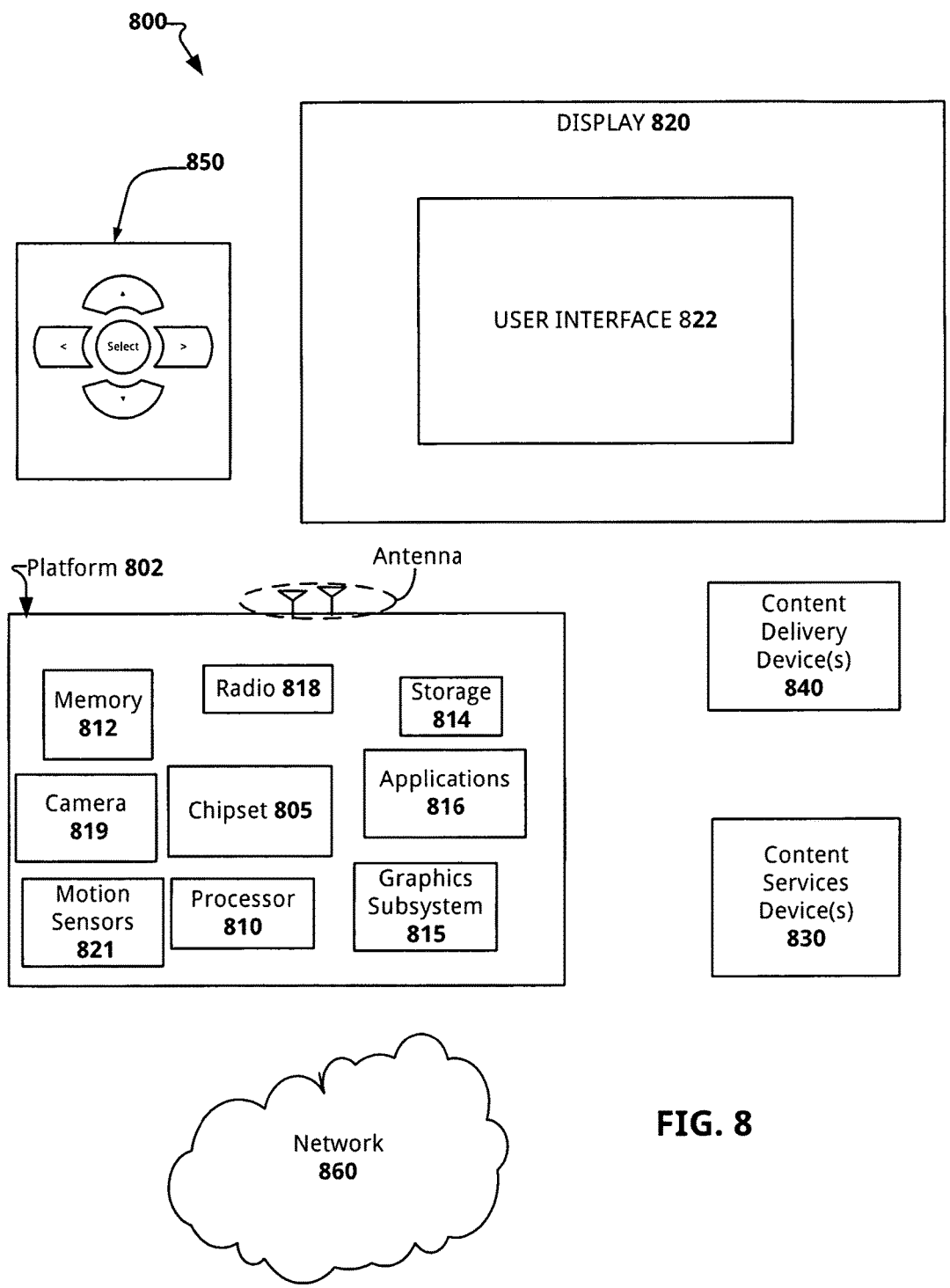
FIG. 8 illustrates a computer system configured with processes to analyze and determine user input based on received touchpad event messages disclosed herein, in accordance with an example embodiment of the present disclosure.

FIG. 8 illustrates a computing system 500 implementing various processes and user input recognition methods variously disclosed herein. For example, system 800 may be incorporated into a personal computer (PC), laptop computer, wearable computing device, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 800 comprises a platform 802 coupled to a display 820. Platform 802 may receive content from a content device such as content services device(s) 830 or content delivery device(s) 840 or other similar content sources. A navigation controller 850 comprising one or more navigation features may be used to interact with, for example, platform 802 and/or display 820, so as to supplement navigational gesturing by the user. Each of these example components is described in more detail below.

In some embodiments, platform 802 may comprise any combination of a chipset 805, processor 810, memory 812, storage 814, graphics subsystem 815, camera 819, motion sensors 821, applications 816 and/or radio 818 or wireless transceiver circuit. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 810 may comprise dual-core processor(s), dual-core mobile processor(s), and so forth. Memory 812 may be implemented, for instance, as a volatile memory device such as, but not limited to, a Random Access Memory (RAM), Dynamic Random Access Memory (DRAM), or Static RAM (SRAM). Storage 814 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 814 may comprise technology to increase the storage performance enhanced protection for valuable digital media when multiple hard drives are included, for example.

Graphics subsystem 815 may perform processing of images such as still or video for display, and in some embodiments is configured to synthesize face images, as variously described herein. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In some embodiments, content services device(s) 830 may be hosted by any national, international and/or independent service and thus accessible to platform 802 via the Internet or other network, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820. In some embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, graphics, text, medical and gaming content, and so forth.

Content services device(s) 830 receives content such as cable television programming including media information, digital information, and/or other content. Examples of content providers may include any cable or satellite television or radio or Internet content providers. The provided examples are not meant to limit the present disclosure. In some embodiments, platform 802 may receive control signals from navigation controller 850 having one or more navigation features. The navigation features of controller 850 may be used to interact with user interface 822, for example. In some embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In some embodiments, controller 850 may not be a separate component but integrated into platform 802 and/or display 820. Embodiments, however, are not limited to the elements or in the context shown or described herein, as will be appreciated.

In some embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off." In addition, chipset 805 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O)

adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 8.

Figure 9:
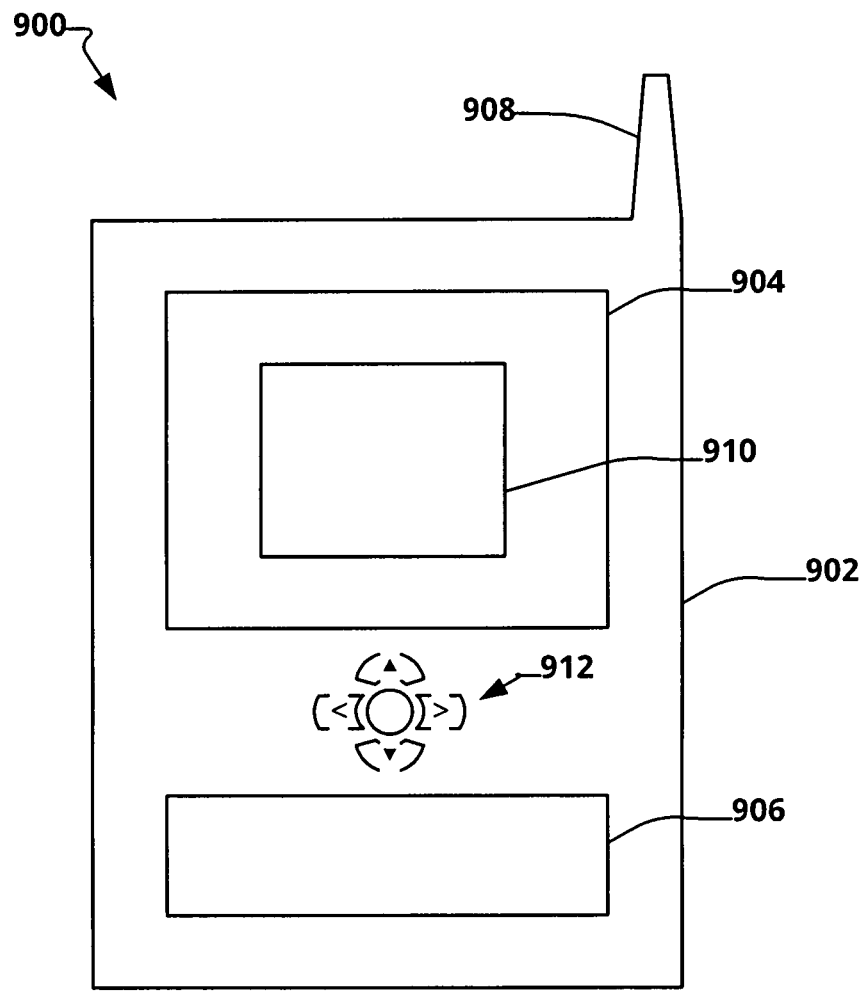
FIG. 9 shows a mobile computing system configured in accordance with an embodiment of the present disclosure.

As described above, system 800 may be embodied in varying physical styles or form factors. FIG. 9 illustrates embodiments of a small form factor device 900 in which system 800 may be embodied. In some embodiments, for example, device 900 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, mobile electronic device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a touchpad display. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 discloses a touchpad system, the touchpad system comprising a touchpad sensor comprising a first flexible substrate layer having a first and second surface, and a first conductive coating layer disposed on the first surface of the first flexible substrate layer, wherein the first conductive coating layer forms a first touch-sensitive portion of the touchpad sensor, a base material layer having an inner and outer surface, a heat seal layer disposed on the second surface of the first flexible substrate, the heat seal layer providing a bonded region between the second surface of the flexible substrate and the inner surface of the base material layer, and a controller electrically coupled to the touchpad sensor and configured to receive an electrical signal from the touchpad sensor, the electrical signal being representative of user input.

Example 2 includes the subject matter of Example 1, wherein the base material layer comprises a layer of an article of clothing or furniture object.

Example 3 includes the subject matter of any one of Examples 1-2, wherein the first conductive coating layer includes graphene.

Example 4 includes the subject matter of any one of Examples 1-3, wherein the first conductive coating layer has a resistance value of at least 3.5 ohms/square.

Example 5 includes the subject matter of any one of Examples 1-3, wherein the first flexible substrate layer comprises a polyethylene terephthalate (PET) film.

Example 6 includes the subject matter of any one of Examples 1-5, wherein the heat seal layer includes a thermoplastic material configured to activate and bond with the base material layer and the first flexible substrate when heated to a predefined temperature.

Example 7 includes the subject matter of any one of Examples 1-6, wherein the first flexible substrate layer is at least partially integrated with the base material layer based on a heat seal or adhesive disposed there between.

Example 8 includes the subject matter of any one of Examples 1-7, wherein the touchpad sensor further comprises a second flexible substrate layer having a first and second surface, and a second conductive coating layer disposed on the first surface of the second flexible substrate layer, wherein the second conductive coating layer forms a second touch-sensitive portion of the touchpad sensor.

Example 9 includes the subject matter of Example 8, wherein the first and second conductive coating layers each provide a pattern of conductive electrodes, and wherein the pattern of conductive electrodes of the first conducting coating layer are configured as receive electrodes, and the pattern of electrodes of the second conducting coating layer are configured as transmit electrodes.

Example 10 includes the subject matter of any one of Examples 8-9, further comprising a common ground layer disposed on the second surface of the second flexible substrate.

Example 11 includes the subject matter of any one of Examples 1-7, wherein the touchpad sensor is implemented as a resistive touchpad sensor.

Example 12 includes the subject matter of any one of Examples 1-10, wherein the touchpad sensor is implemented as a capacitive touchpad sensor.

Example 13 includes the subject matter of any one of Examples 1-12, wherein the touchpad sensor has a thickness W of about 16 mils or less.

Example 14 includes the subject matter of any one of Examples 1-13, further comprising a wireless transceiver device, and wherein the controller is configured to communicatively couple to the wireless transceiver device, and wherein the controller is further configured to decode at least one XY coordinate of the user input based on the received electrical signal, determine a timestamp value corresponding to each decoded XY coordinate, and send at least one touchpad event message to a remote computing device via the wireless transceiver device, each touchpad event message including the at least one decoded XY coordinate.

Example 15 includes the subject matter of Example 14, wherein the wireless transceiver device is Bluetooth transceiver configured to form a Bluetooth low-energy (BLE) data link.

Example 16 discloses a method of forming a touchpad sensor, the method comprising depositing conductive ink onto a first surface of a first flexible substrate layer to form a first layer of conductive coating, applying a heat seal layer onto at least a portion of a second surface of the first flexible substrate layer, disposing a base material layer on to the heat seal layer, and applying a heating element for a predefined period of time onto the base material layer to cause a bonded region to form between the first flexible substrate layer and the base material layer.

Example 17 includes the subject matter of Example 16, wherein depositing the conductive ink further includes depositing and setting the conductive ink onto the first flexible substrate using a screen printing technique.

Example 18 includes the subject matter of any one of Examples 16-17, wherein the first conductive coating layer provides a resistance of at least 3.5 omhs/square.

Example 19 includes the subject matter of any one of Examples 16-18, wherein the first conductive coating layer is about 0.28 mils or less.

Example 20 includes the subject matter of any one of Examples 16-19, wherein depositing conductive ink further includes selectively depositing conductive ink to form an electrode pattern, the electrode pattern providing an MxN array of electrodes.

Example 21 includes the subject matter of any one of Examples 16-19, wherein the touchpad sensor is implemented as a resistive or capacitive touchpad sensor.

Example 22 includes the subject matter of any one of Examples 16-21, wherein the base material layer is integrated into furniture or an article of clothing.

Example 23 discloses a touchpad system, the touchpad system comprising a touchpad sensor configured to detect touch-input from a user and provide an electrical signal representing the detected touch-input, the touchpad sensor including a plurality of flexible material layers including at least one conductive coating layer, and wherein at least one layer of the plurality of flexible material layers is heat sealed to a layer of clothing, a Bluetooth low-energy (BLE) wireless transceiver device, at least one controller coupled to the touchpad sensor and the BLE wireless transceiver device, the at least one controller being configured to receive the electrical signal representative of detected touch-input from the touchpad sensor, decode at least one XY coordinate of the touch-input based on the electrical signal, determine a timestamp value corresponding to each decoded XY coordinate, and send at least one touchpad event message to a remote computing device via the wireless transceiver device, each touchpad event message including the at least one decoded XY coordinate and an associated timestamp value.

Example 24 includes the subject matter of Example 23, wherein the layer of clothing comprises one or more types of synthetic fiber, or one or more types of non-synthetic fiber, or both.

Example 25 includes the subject matter of any one of Examples 23-24, wherein the conductive coating layer comprises graphene.

Example 26 includes the subject matter of any one of Examples 23-25, wherein a bottom surface of the touchpad sensor is at least partially bonded to a second layer of clothing based on a heat seal formed there between.

Example 27 includes the subject matter of any one of Examples 23-26, wherein the touchpad sensor is a resistive touchpad sensor.

Example 28 includes the subject matter of any one of Examples 23-26, wherein the touchpad sensor is a capacitive touchpad sensor.

Example 29 discloses a computer-readable medium having a plurality of non-transitory instructions encoded thereon that when executed by at least one processor cause a process to be carried out, the process being configured to receive at least one touchpad event message, each touchpad event message including a user-touchpoint XY coordinate corresponding to a detected user input and a timestamp associated with the detected user input, analyze the at least one touchpad event message to determine a user input, and perform a predefined action based on the determined user input.

Example 30 includes the subject matter of Example 29, wherein the user input is determined based at least in part on identifying a pattern within a plurality of user-touchpoint XY coordinates.

Example 31 includes the subject matter of any one of Examples 29-30, wherein the determined user input is at least one of a character, a string of characters, or a symbol.

Example 32 includes the subject matter of any one of Examples 29-30, wherein the determined user input corresponds to a gesture, the gesture comprising a pinch-gesture, a flick-gesture, a swipe-gesture, or a tap-gesture.

Example 33 includes the subject matter of any one of Examples 29-32, wherein the predefined action is at least one of a mouse command or a keyboard command.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A touchpad system, comprising:
    a touchpad sensor comprising:
        a first flexible substrate layer
        a first conductive coating layer disposed on the first flexible substrate layer;
        a dielectric layer disposed on the first conductive coating layer;
        a second conductive coating layer disposed on the dielectric layer;
        a second flexible substrate layer disposed on the second conductive coating layer;
        a first heat seal layer disposed on the second flexible substrate layer;
        a base material layer having an inner surface and an outer surface; and
    a controller electrically coupled to the touchpad sensor;
    wherein:
        the first and second conductive coating layers each form a touch-sensitive portion of the touchpad sensor;
        the first heat seal layer is at least partially bonded to the inner surface of of the base material layer to provide at least one bonded region between a surface of the second flexible substrate layer and the inner surface of the base material layer; and
        the controller is configured to receive an electrical signal from the touchpad sensor, the electrical signal being representative of a user input.

2. The touchpad system of claim 1, wherein the second flexible substrate layer is a polymer film and the heat seal layer is directly on the second flexible substrate layer.

3. The touchpad system of claim 1, wherein the second conductive coating layer includes graphene.

4. The touchpad system of claim 1, wherein the second conductive coating layer has a resistance value of at least 3.5 ohms/square.

5. The touchpad system of claim 1, wherein the second flexible substrate layer comprises a polyethylene terephthalate (PET) film.

6. The touchpad system of claim 1, wherein the first heat seal layer includes a thermoplastic material configured to activate and bond with the base material layer and the second flexible substrate when heated to a predefined temperature.

7. The touchpad system of claim 1, further comprising a common ground layer, wherein the first flexible substrate layer is disposed on the common ground layer.

8. The touchpad system of claim 7, further comprising a second heat seal layer, wherein the common ground layer is disposed on the second heat seal layer.

9. The touchpad system of claim 1, wherein:
    the first and second conductive coating layers each provide a pattern of conductive electrodes; and
    the pattern of conductive electrodes of the second conductive coating layer are configured as receive electrodes, and the pattern of electrodes of the first conductive coating layer are configured as transmit electrodes.

10. The touchpad system of claim 1, further comprising a common ground layer and a second heat seal layer, wherein:
    the first flexible substrate layer is disposed on the common ground layer;
    the common ground layer is disposed on the second heat seal layer; and
    the common ground layer is patterned to define an air gap is present between the first flexible substrate layer and the second heat seal layer.

11. The touchpad system of claim 1, wherein the touchpad sensor is implemented as a resistive touchpad sensor.

12. The touchpad system of claim 1, wherein the touchpad sensor is implemented as a capacitive touchpad sensor.

13. The touchpad system of claim 1, wherein the touchpad sensor has a thickness W of about 16 mils or less.

14. The touchpad system of claim 1, further comprising a wireless transceiver device, and wherein the controller is configured to communicatively couple to the wireless transceiver device, and wherein the controller is further configured to:
    decode at least one XY coordinate of the user input based on the received electrical signal;
    determine a timestamp value corresponding to each decoded XY coordinate; and
    send at least one touchpad event message to a remote computing device via the wireless transceiver device, each touchpad event message including the at least one decoded XY coordinate.

15. The touchpad system of claim 14, wherein the wireless transceiver device is Bluetooth transceiver configured to form a Bluetooth low-energy (BLE) data link.

16. A method of forming a touchpad sensor, the method comprising:
- depositing conductive ink onto a first surface of a first flexible substrate layer to form a first conductive coating layer on the first flexible substrate layer;
- depositing conductive ink onto a first surface of a second flexible substrate layer to form a second conductive coating layer on the second flexible substrate layer;
- providing a dielectric layer;
- disposing the first and second conductive coating layers onto opposing sides of the dielectric layer such that a first surface of the dielectric layer is on a second surface of the first conductive coating layer, and second surface of the second conductive coating layer is on a second surface of the dielectric layer;
- applying a first heat seal layer onto at least a portion of a second surface of the second flexible substrate layer;
- disposing a base material layer on the first heat seal layer; and
- applying heat to the base material layer to cause the first heat seal layer to at least partially bond to an inner surface of the base material layer and provide at least one bonded region between a surface of the second flexible substrate layer and the inner surface of the base material layer.

17. The method of claim 16, wherein depositing conductive ink on the first surface of the flexible substrate layer comprises screen printing said conductive ink on the first surface of the second flexible substrate layer.

18. The method of claim 16, wherein the second conductive coating layer provides a resistance of at least 3.5 ohms/square.

19. The method of claim 16, wherein the second conductive coating layer is about 0.28 mils or less.

20. The method of claim 16, wherein depositing said conductive ink on the first surface of the second flexible substrate layer comprises selectively depositing said conductive ink on the first surface of the second flexible substrate layer to form an electrode pattern, the electrode pattern providing an M×N array of electrodes.

21. The method of claim 16, wherein the second flexible substrate layer comprises a polyethylene terephthalate film.

22. The method of claim 16, wherein the second flexible substrate layer is a polymer film and the heat seal layer is directly on the second flexible substrate layer.

23. A touchpad system, comprising:
- a touchpad sensor configured to detect touch-input from a user and provide an electrical signal representing the detected touch-input;
- a Bluetooth low-energy (BLE) wireless transceiver device;
- at least one controller coupled to the touchpad sensor and the BLE wireless transceiver device, the at least one controller being configured to:
  - receive the electrical signal representative of detected touch-input from the touchpad sensor;
  - decode at least one XY coordinate of the touch-input based on the electrical signal;
  - determine a timestamp value corresponding to each decoded XY coordinate; and
  - send at least one touchpad event message to a remote computing device via the wireless transceiver device, each touchpad event message including the at least one decoded XY coordinate and an associated timestamp value;

wherein:
the touchpad sensor comprises:
- a first flexible substrate layer;
- a first conductive coating layer disposed on the first flexible substrate layer;
- a dielectric layer disposed on the first conductive coating layer;
- a second conductive coating layer disposed on the dielectric layer;
- a second flexible substrate layer disposed on the second conductive coating layer;
- a first heat seal layer disposed on the second flexible substrate layer; and
- the first heat seal layer is heat bonded to a base material layer, wherein the base material layer comprises a layer of clothing.

24. The touchpad system of claim 23, wherein the second flexible substrate layer is a polymer film and the heat seal layer is directly on the second flexible substrate layer.

25. The touchpad system of claim 23, wherein the second flexible substrate layer comprises a layer of polyethylene terephthalate.

* * * * *